United States Patent
Wei et al.

(10) Patent No.: US 11,768,700 B2
(45) Date of Patent: Sep. 26, 2023

(54) CONTEXTUAL APPLICATION SWITCH BASED ON USER BEHAVIORS

(71) Applicant: Citrix Systems, Inc., Fort Lauderdale, FL (US)

(72) Inventors: Daowen Wei, Nanjing (CN); Jian Ding, Nanjing (CN); Hengbo Wang, Nanjing (CN); Feng Tao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 542 days.

(21) Appl. No.: 16/855,100

(22) Filed: Apr. 22, 2020

(65) Prior Publication Data

US 2021/0311774 A1    Oct. 7, 2021

Related U.S. Application Data

(63) Continuation of application No. PCT/CN2020/083062, filed on Apr. 2, 2020.

(51) Int. Cl.
    *G06F 9/48*     (2006.01)
    *G06F 9/451*    (2018.01)
    *G06N 20/00*    (2019.01)

(52) U.S. Cl.
    CPC ............... *G06F 9/48* (2013.01); *G06F 9/451* (2018.02); *G06N 20/00* (2019.01)

(58) Field of Classification Search
    CPC ............ G06F 9/48; G06F 9/451; G06N 20/00
    See application file for complete search history.

(56) References Cited

U.S. PATENT DOCUMENTS 10,740,118 B1 *  8/2020  Pottjegort ........... G06F 11/3438
10,846,050 B2 * 11/2020  Yang ....................... G06F 40/30
(Continued)

FOREIGN PATENT DOCUMENTS

CN    106170766 A  * 11/2016  ........... G06F 3/0482
CN    111381902 A  *  7/2020  ......... G06F 9/44505
EP      3482297 B1 *  5/2021  ............ G06F 11/302

OTHER PUBLICATIONS

Garcia et al., "A Review on Deep Learning Techniques Applied to Semantic Segmentation", Apr. 2017, arXiv.org (Year: 2017).*

(Continued)

*Primary Examiner* — Wei Y Zhen
*Assistant Examiner* — Junchun Wu

(57) ABSTRACT

Methods and systems for using machine learning to provide application recommendations are described herein. A computing device may capture a first edge frame of a first application displayed at the computing device. The computing device may apply machine learning to the first edge frame of the first application to identify a context tag. The computing device may identify applications subsequently accessed in a sequential manner after accessing the first application in a context corresponding to the identified context tag, where each of the applications corresponds to a context level score. The computing device may identify a second application, which may have a higher context level score than remaining applications. Along with the first application, the computing device may display a selectable interface element corresponding to the second application, and selection of the selectable interface element may cause display of an application list that includes the second application.

18 Claims, 14 Drawing Sheets

(56) References Cited

U.S. PATENT DOCUMENTS

| | | | |
|---|---|---|---|
| 10,917,439 B2* | 2/2021 | Purathepparambil | ....................... H04L 63/145 |
| 11,340,895 B2* | 5/2022 | Tommasi | ............ G06F 9/44505 |
| 11,616,839 B2* | 3/2023 | Sharma | ................... H04L 67/34 706/12 |
| 2007/0240054 A1* | 10/2007 | Todoroki | ................ G06F 9/451 715/700 |
| 2013/0067359 A1* | 3/2013 | Lalmalani | ............... G06F 16/93 715/760 |
| 2018/0121825 A1* | 5/2018 | Kumar | ................... G06N 20/00 |
| 2018/0131711 A1* | 5/2018 | Chen | ..................... H04L 43/026 |
| 2018/0314980 A1* | 11/2018 | Osotio | .................... G06F 9/451 |
| 2018/0348999 A1* | 12/2018 | Wu | ........................ G06F 9/451 |
| 2020/0111027 A1* | 4/2020 | Qin | .................... G06Q 30/0269 |
| 2021/0232478 A1* | 7/2021 | M Y | ................. G06F 16/90335 |
| 2021/0311774 A1* | 10/2021 | Wei | ......................... G06F 9/451 |

OTHER PUBLICATIONS

Chen et al., "Deep Learning With Edge Computing: A Review", 2019, IEEE (Year: 2019).*
Teerapittayanon et al., "Distributed Deep Neural Networks over the Cloud, the Edge and End Devices", 2017, IEEE (Year: 2017).*
Wang et al., "Towards Scalable Edge-Native Applications", Nov. 2019, ACM (Year: 2019).*

* cited by examiner

| App Name | Context Tag | Next App | Score |
|---|---|---|---|
| App #1 | Computer HW | App #2 | 20.5 |
| | | App #3 | 9.7 |
| | Default | App #2 | 32 |
| | | App #4 | 10.2 |
| | Invoice | App #3 | 5.6 |
| | | App #4 | 3.8 |
| App #2 | Invoice | App #3 | 17.2 |
| | | App #4 | 8.5 |

CONTEXTUAL APPLICATION SWITCH BASED ON USER BEHAVIORS

CROSS-REFERENCE TO RELATED APPLICATIONS

The present application is a continuation of International Application No. PCT/CN2020/083062, filed Apr. 2, 2020, and entitled "Contextual Application Switch Based on User Behaviors," which is hereby incorporated by reference as to its entirety.

FIELD

Aspects described herein generally relate to computer networking, remote computer access, virtualization, enterprise mobility management, and hardware and software related thereto. More specifically, one or more aspects describe herein provide machine learning techniques for next application recommendations for application switching.

BACKGROUND

Many organizations and individuals rely on applications to perform various functionalities on their personal computing devises. As additional applications are installed, it becomes increasingly difficult to locate a desired application (e.g., application icons that do not fit on a particular screen may be organized into icon folders and/or added to new navigational pages, which may be reached through scrolling from one navigation page to another, and/or organized into icon folders). This may result in reduced productivity, as time may be wasted searching for desired applications.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a computing device, including at least one processor, a communication interface, and memory, configured to apply machine learning techniques for application recommendations. The computing device may capture a first edge frame of a first application displayed on a display of the computing device. The computing device may apply one or more machine learning models to the first edge frame of the first application to identify a context tag for the first application. The computing device may identify a plurality of applications subsequently accessed in a sequential manner after accessing the first application in a context corresponding to the identified context tag, where each of the plurality of applications corresponds to one of a plurality of context level scores. The computing device may identify a second application of the plurality of applications, where the second application corresponds to a higher context level score than remaining applications of the plurality of applications. Along with the first application, the computing device may display a selectable interface element corresponding to the second application of the plurality of applications, where selection of the selectable interface element causes the computing device to display a next application list that includes the second application.

In one or more instances, the first edge frame may be a screenshot from the first application, captured within a first predetermined period of time of an application switch from the first application to the second application. In one or more instances, the computing device may identify context information comprising, for the first edge frame, one or more of: a name of the first application, a unique device identification, a first timestamp of a launch time of the first application, a second timestamp of an exit time from the first application, a context tag, a time interval between the first timestamp and the second timestamp, or a name of the second application.

In one or more instances, the computing device may generate, prior to capturing the first edge frame of the first application, a plurality of training samples by: 1) recording a timestamp corresponding to launch of an application, 2) recording a timestamp corresponding to exit from the application, 3) capturing, within a second predetermined period of time of the exit from the application, a corresponding edge frame of the application, 4) applying one or more machine learning algorithms to the corresponding edge frame to identify a corresponding context tag of the corresponding edge frame of the application, 5) identifying an application name and a device identifier corresponding to the launch of the application, 6) generating, based on the corresponding context tag, application name, and device identifier, a training sample, and 7) inserting, into a central repository, the training sample, resulting in storage of the plurality of training samples at the central repository.

In one or more instances, the computing device may apply the one or more machine learning algorithms by: 1) comparing a usage frequency value of the application to a predetermined application popularity threshold, 2) in response to determining that the usage frequency value of the application exceeds the predetermined application popularity threshold, applying one or more supervised learning techniques to the corresponding edge frame of the application, and 3) in response to determining that the usage frequency value of the application does not exceed the predetermined application popularity threshold: applying one or more unsupervised learning techniques to the corresponding edge frame of the application.

In one or more instances, the computing device may identify training samples for which the one or more supervised learning techniques were applied. The computing device may display an authorization prompt requesting user input granting authorization for the identified training samples to be uploaded to a cloud computing device. In response to receiving the user input granting authorization, the computing device may upload the identified training samples to the cloud computing device, which may cause the cloud computing device to update one or more stored image classifiers, each corresponding to a particular application. Once the one or more stored image classifiers have been updated based on the identified training samples, the computing device may download one or more updated image classifiers.

In one or more instances, the computing device may identify training samples for which the one or more unsupervised learning techniques were applied. For each identified training sample, the computing device may determine whether a corresponding image classifier has been updated within a third predetermined period of time. In response to determining that a particular image classifier has not been updated within the third predetermined period of time, the computing device may update a locally stored clustering model based on the identified training samples. In response to determining that the particular image classifier has been updated within the third predetermined period of time, the computing device may determine that the locally stored clustering model should not yet be updated.

In one or more instances, the computing device may apply the one or more machine learning algorithms to the first edge frame by: 1) comparing a usage frequency value of the first application to the predetermined application popularity threshold, 2) in response to determining that the usage frequency value of the first application exceeds the predetermined application popularity threshold, applying one of the one or more updated image classifiers corresponding to the first application, and 3) in response to determining that the usage frequency value of the first application does not exceed the predetermined application popularity threshold, applying the locally stored clustering model to the first application.

In one or more instances, prior to capturing the first edge frame for the first application, the computing platform may compute the plurality of context level scores by: 1) identifying, within the plurality of training samples, a subset of the plurality of training samples collected within a fourth predetermined period of time, 2) computing, for each of the subset of the plurality of training samples, a switch interval, corresponding to an amount of time between an application launch and an application exit, 3) comparing each switch interval to a fourth predetermined period of time; and 4) for each of the subset of the plurality of training samples: a) in response to determining that the switch interval exceeded the fourth predetermined period of time, setting a next application value to a null value, and b) in response to determining that the switch interval did not exceed the fourth predetermined period of time, setting a next application value to a name of another application that was subsequently and sequentially accessed.

In one or more instances, the computing device may aggregate the plurality of training samples corresponding to each application represented in the plurality of training samples, resulting in an aggregated dataset that includes: 1) for each application name, an aggregation of one or more context tags from the plurality of training samples corresponding to the application name, resulting in one or more application-context tag pairs, 2) for each application-context tag pair, one or more corresponding subsequently and sequentially accessed applications, resulting in one or more application-context tag-subsequent application correlations, and 3) for each application-context tag-subsequent application correlation, a frequency value, representing a number of times the application-context tag-subsequent application correlation is present in the plurality of training samples. For each frequency value, the computing device may compute a context level score.

In one or more instances, the computing device may compute the context level score by computing an exponential weighted moving average by applying: $Y_n = \theta Y_{n-1} + (1-\theta)X_n$, where: 1) $Y_n$ is the exponential weighted moving average at n, where: n is a day index in sequence starting from one, 2) $X_n$ is an access frequency value of a subsequent application in a day at n, $$\theta = \min\left\{a, \frac{1+c}{\beta+c}\right\}, \quad 3)$$

where: a) u is a total number of days elapsed, b) α is a degree of weighting decrease after a cold start phase, c) and θ is a maximum value between α and $$\frac{1+C}{\beta+C},$$

and 4)

$$\beta = \frac{1+T}{\alpha} - T,$$

where: β is a regulation factor for weighting decay in the cold start phase, and T is a number of days in the cold start phase. In one or more instances, selection of the selectable interface element further may cause the computing device to launch the second application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
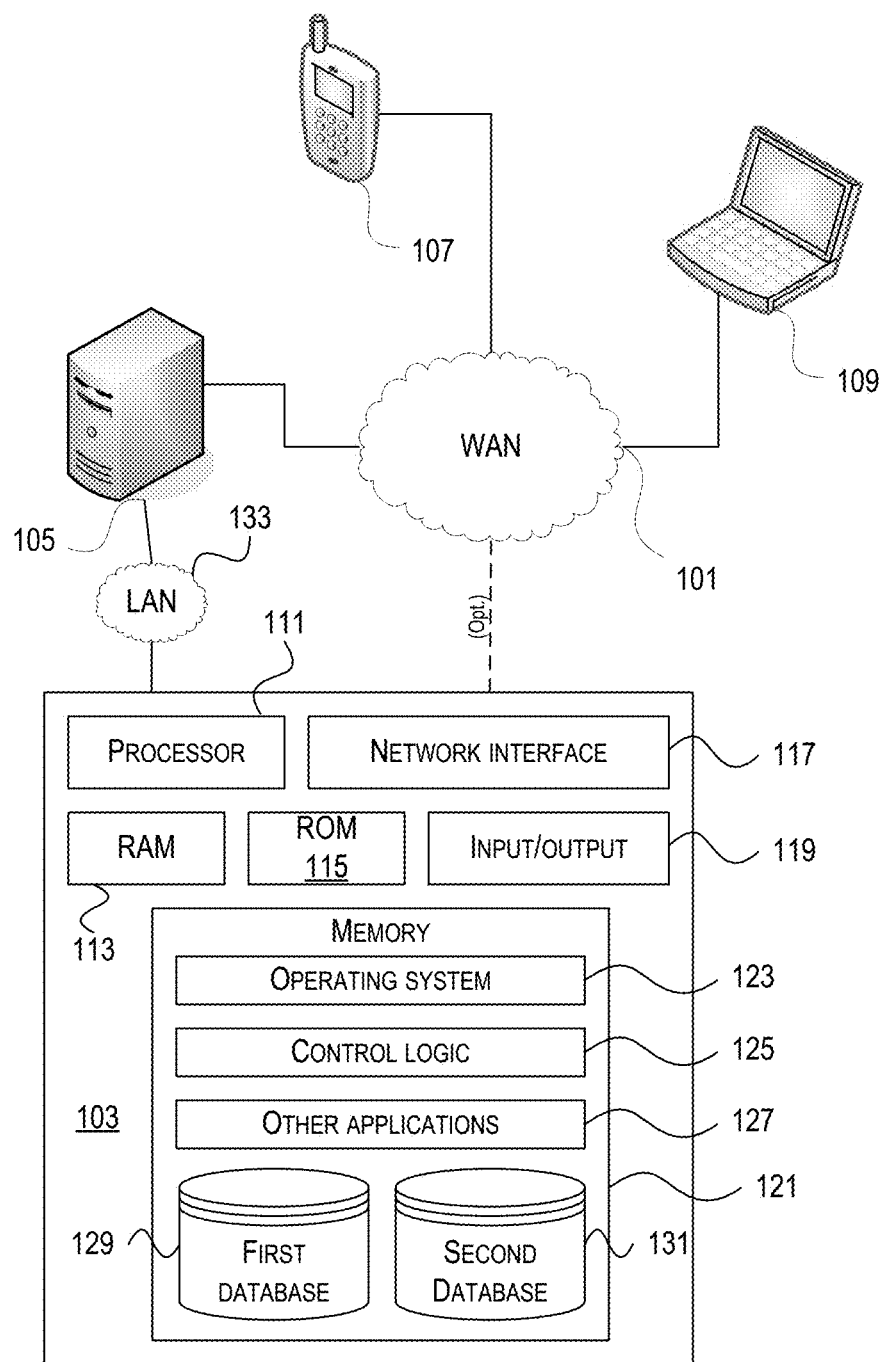
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards applying machine learning to provide next application recommendations. More specifically, one or more of the systems and methods described herein describe recommending next applications for application switching based on access frequency of subsequent applications and contextual information corresponding to application switching over a predetermined historical period. In doing so, one or more of the systems and methods described herein may offer seamless application switching across local and/or virtual applications and improve user productivity on mobile devices.

Accordingly, one or more technical benefits may be achieved through the systems and methods described herein. For example, by generating a recommended application for application switching, inefficient application searching on mobile devices and/or within a workspace application store may be avoided and user productivity may be increased. Furthermore, proposing next application recommendations based on access frequency of subsequent applications at a context level, user operations, and background context of an initial application, accuracy of these recommendations may be enhanced. As yet another benefit, by tagging contextual images with supervised learning for popular applications and unsupervised learning for other applications, the one or more systems and methods described herein are configured for flexible deployment and scalability, and offer a balance between user privacy and convenience.

The number of available mobile applications may be steadily increasing, and users often install dozens of applications on their mobile devices with various functionalities. Furthermore, hundreds of virtual applications are published to application stores. As time progresses, it may become increasingly difficult to find a desired local or virtual application to perform an application switch. For example, most local or virtual applications are accessed by endless scrolling, tap touch, application name search, or the like.

Typically, mobile application icons are arranged in a grid layout which may help users to organize applications. Most mobile devices may show up to roughly twenty four icons at once per page due to limited screen size. Icons that do not fit on the screen may either be put on a new page to be accessed by scrolling, and/or be organized hierarchically into icon folders to be accessed by selecting the folder and/or navigating to the icon accordingly.

When there are dozens of local applications organized in different pages or icon folders and/or when there is a long application list in a virtual workspace, it may be inconvenient or efficient for users to access these applications. Accordingly, as described above, users suffer from endless scrolling, tapping, and/or navigating in mobile devices, which results in a significant decrease in productivity.

Of course, users may switch from one application to another background application by scrolling through tiles representing currently opened applications (e.g., using application switcher on a mobile device). However, the user must keep swiping left or right to find an application that he or she wants to use and then tap the application to launch and/or move the application into the foreground. Furthermore, when a target application is not running in the background, the user may search for it across numerous pages and/or icon folders.

Regardless of whether an application is navigated to through application switcher or across numerous pages, it may be time consuming and inefficient to access desired applications on mobile devices. Furthermore, users may also be frustrated when accessing virtual applications in virtual desktops with long application lists. This problem will persist with frequent application switching on mobile devices. In some instances, these problems may also be prevalent on computer applications (e.g., accessed on desktop computers, laptop computers, or the like)

Accordingly, one or more of the systems and methods described herein introduce a contextual application switch based on user behaviors across local and/or virtual applications on mobile devices and/or personal computers. In doing so, one or more of the systems and methods described herein recommend next applications for application switch based on access frequency of subsequent applications over a predetermined time period (e.g., the past few weeks), together with contextual corresponding to an application switch.

To do so, contextual information may be captured with an image when a user switches from one application to another, and may be classified into different context tags by machine learning algorithms. As an introduction to these context tags, access frequency of next applications may be organized with smaller granularity into a context level within an application level. These context tags may be meaningful identifications depicting contextual information when an application switch occurs (e.g., computer homework, invoice reimbursement, English recording, or the like).

By using this contextual information, one or more of the systems and methods described herein may improve accuracy and precision for provided next application recommendations. For example, if contextual information is not considered, applications may be recommended based on access frequency without considering what happens in the context of the initial application. For example, if the initial application is being accessed for a first context (e.g., homework), the next application may be different than if the initial application is being accessed for a second context (e.g., invoice reimbursement context).

Contextual application switch depends on screenshots captured when application switching occurs. As described herein, a single screenshot and its corresponding context information are captured for image classification. These screenshots are stored locally on the mobile device for user privacy protection. In some instances, however, user permission may be granted to upload these images to a cloud compute platform to retrain image classifiers for improved accuracy and precision. In some instances, random mosaics may be masked in screenshots to avoid full data exposure.

Thus, by performing the one or more methods described herein, next applications may be recommended based on access frequency of subsequent applications over a predetermined period of time together with application context information. Application level image classifiers on the mobile device may recognize the context tag to provide next application recommendations while avoiding data leakage and privacy exposure.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
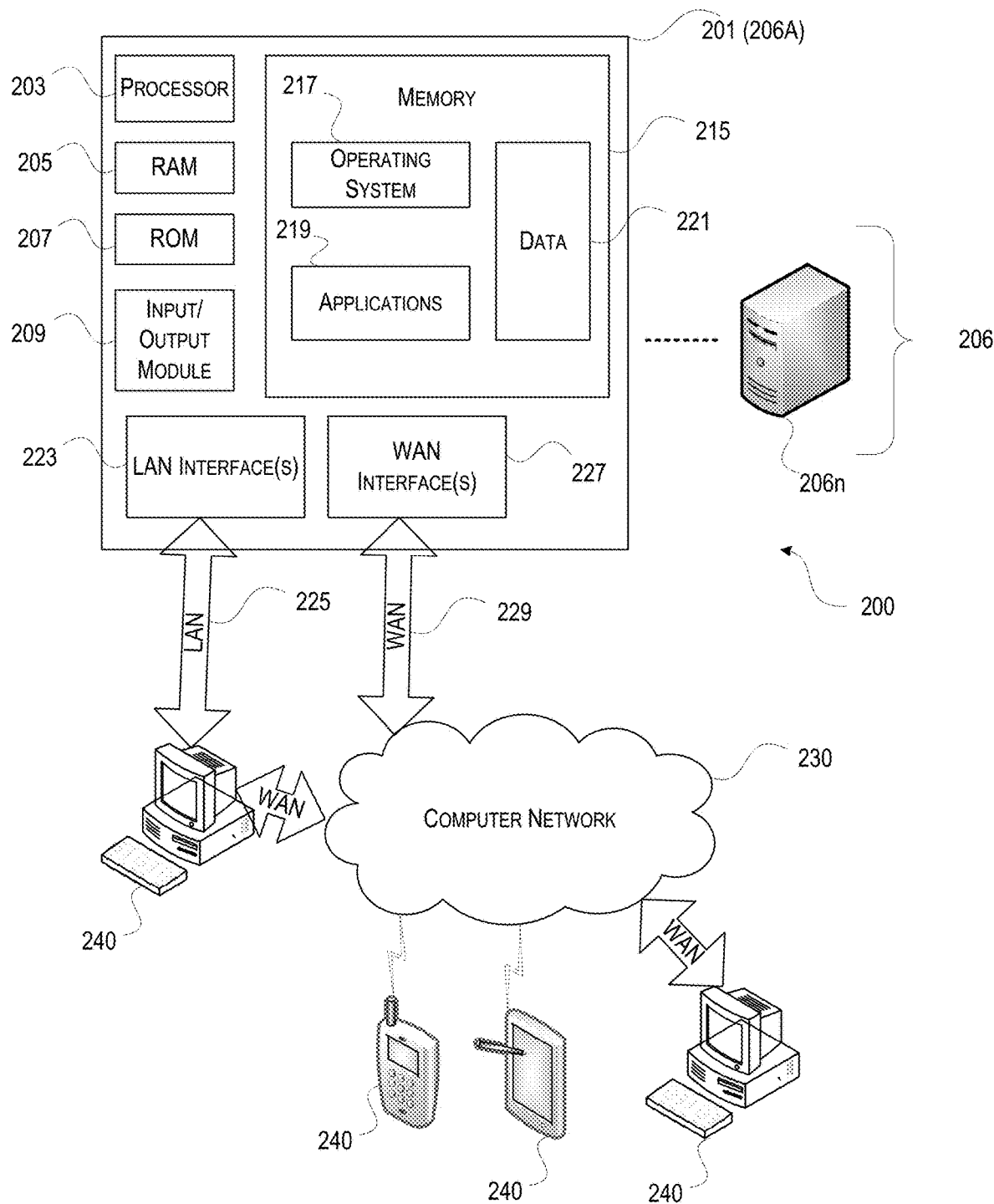
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
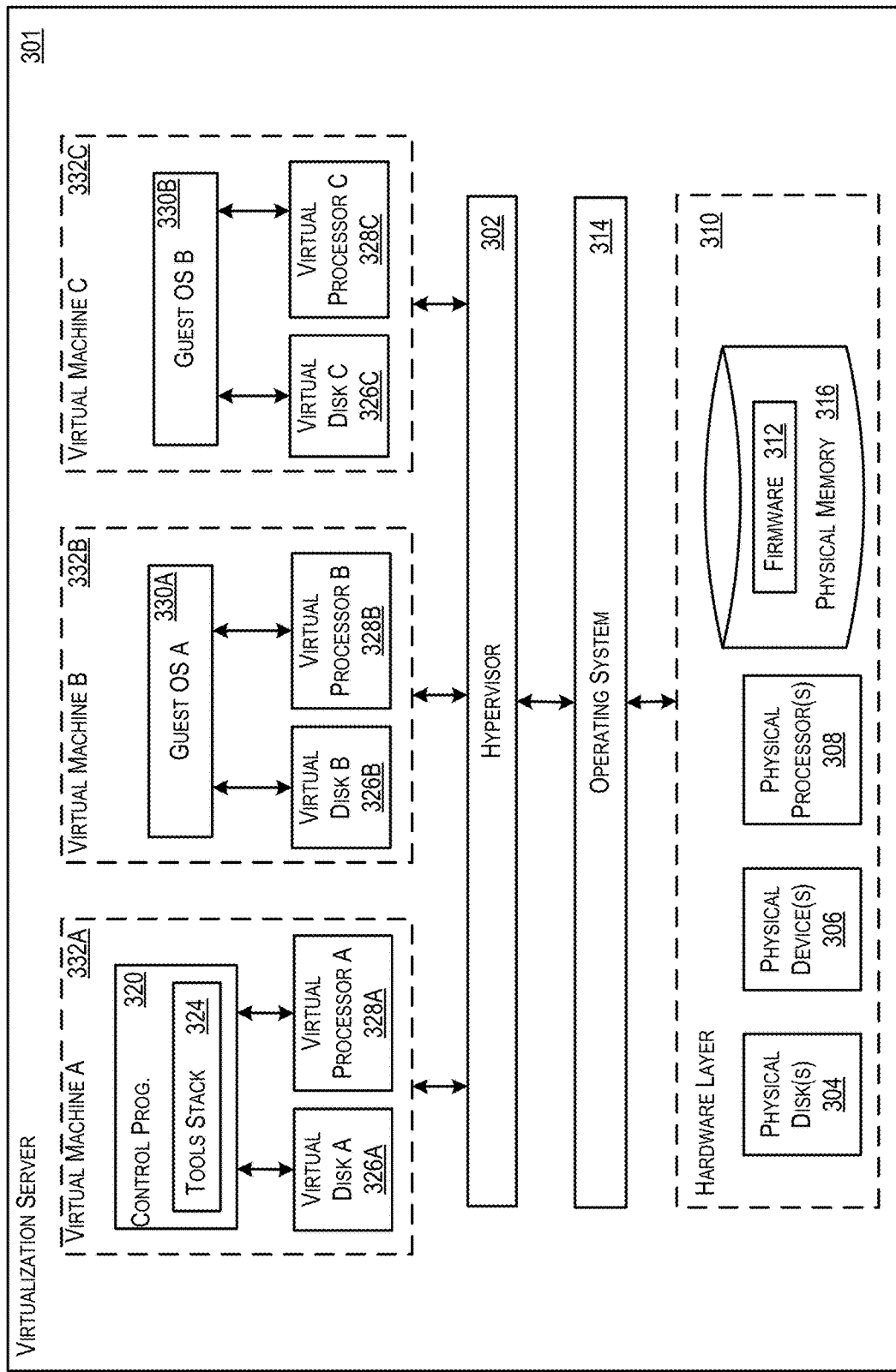
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
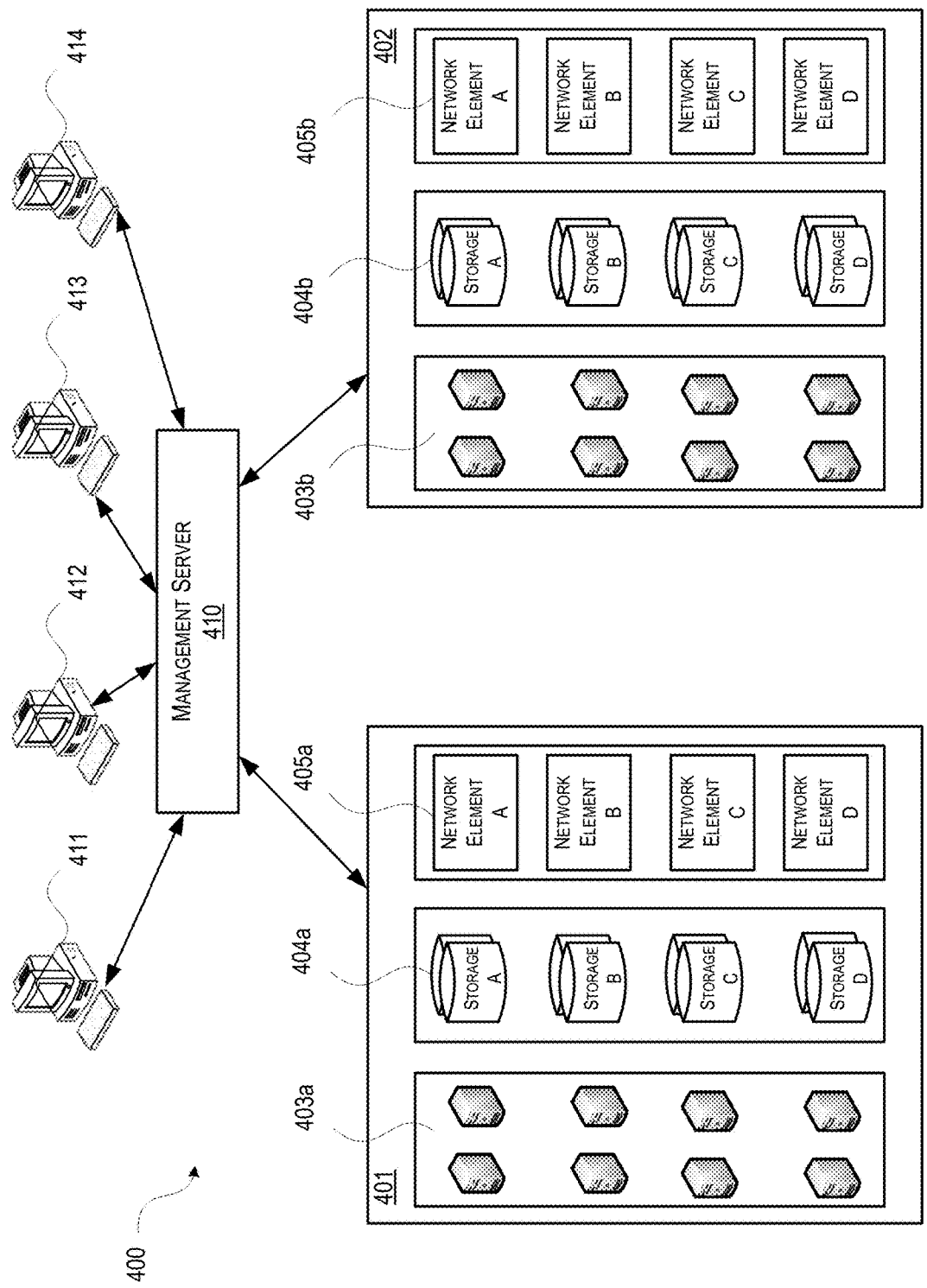
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
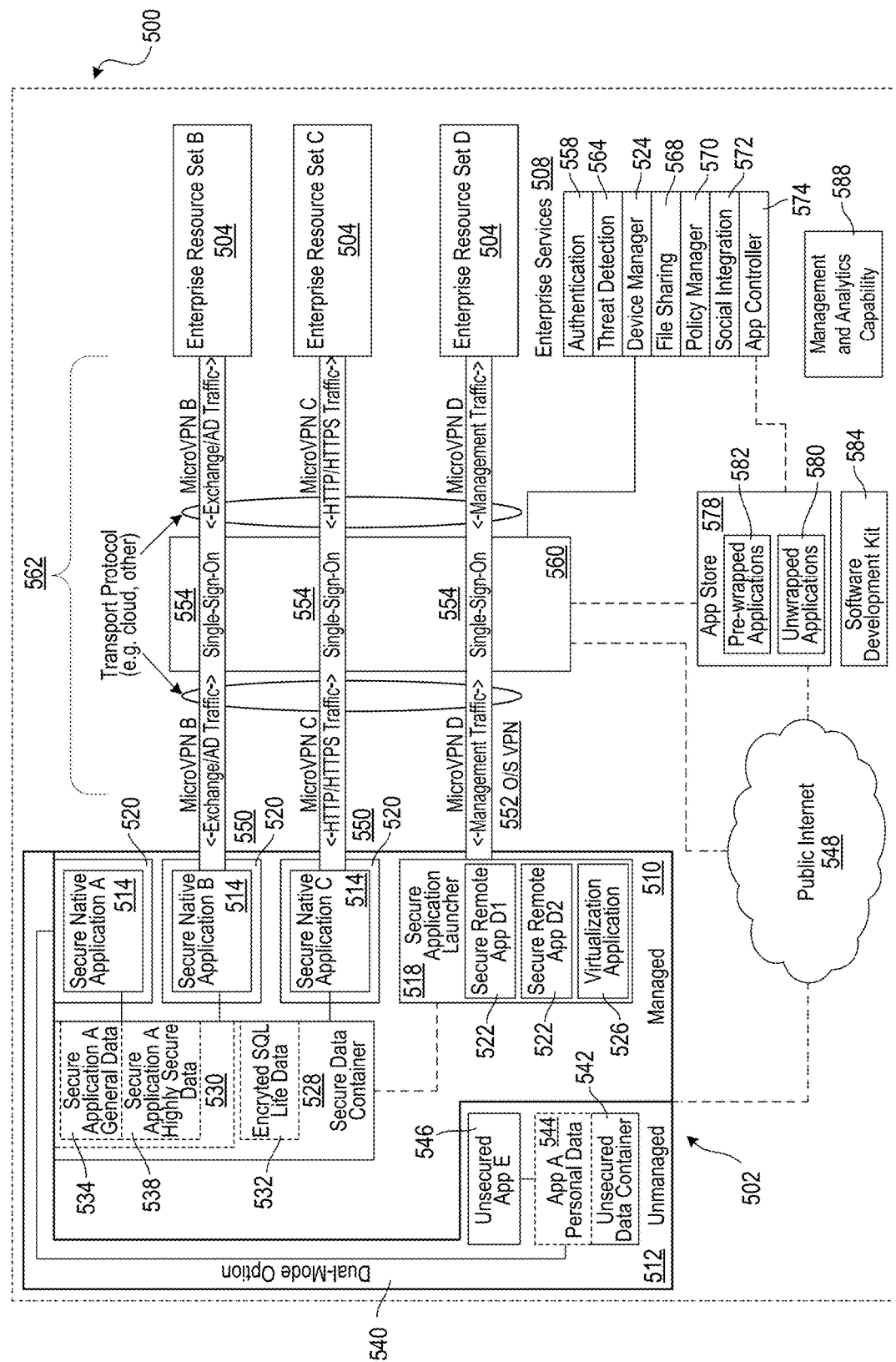
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
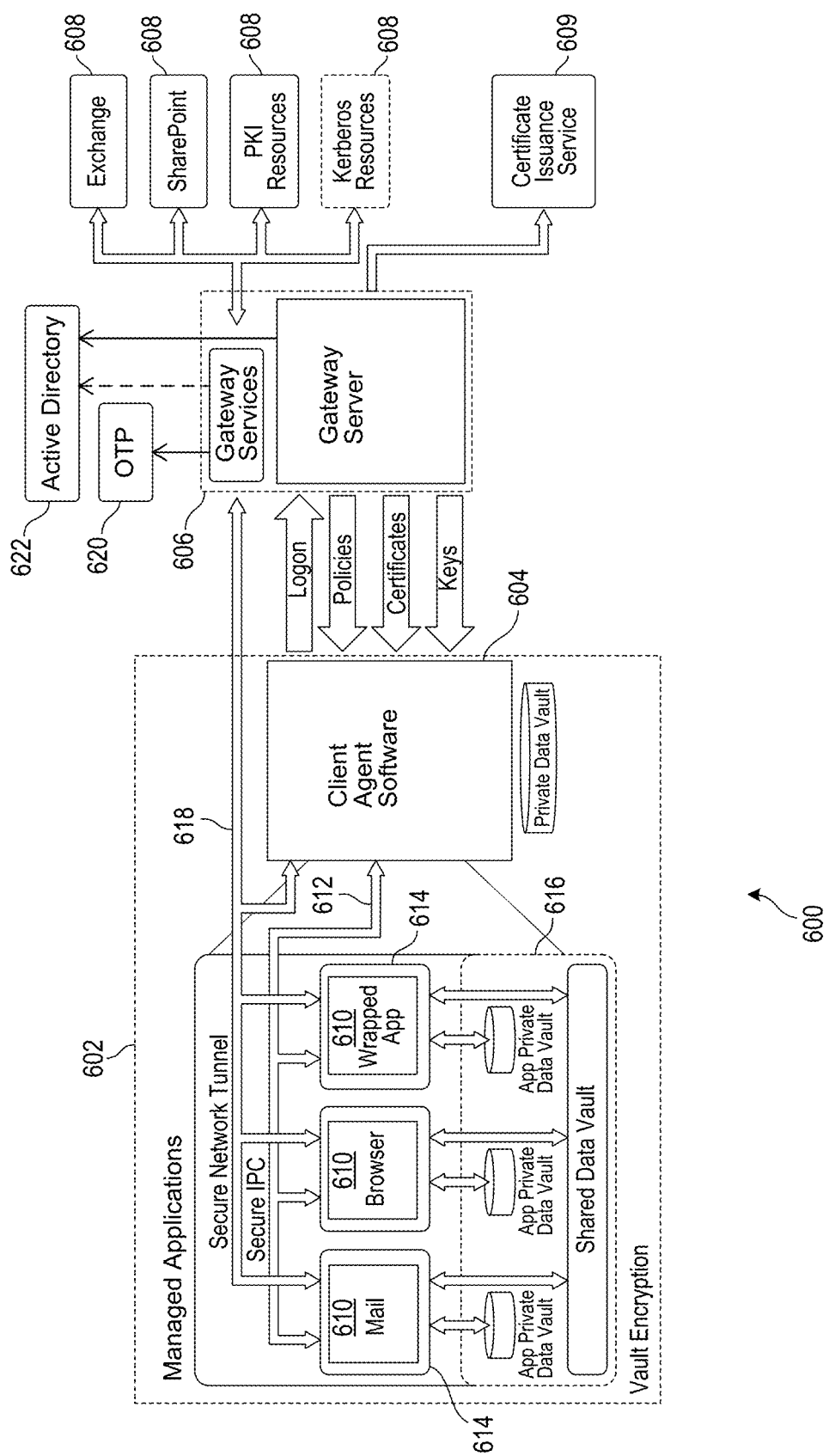
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Contextual Application Switch Based on User Behaviors

Figure 7A:
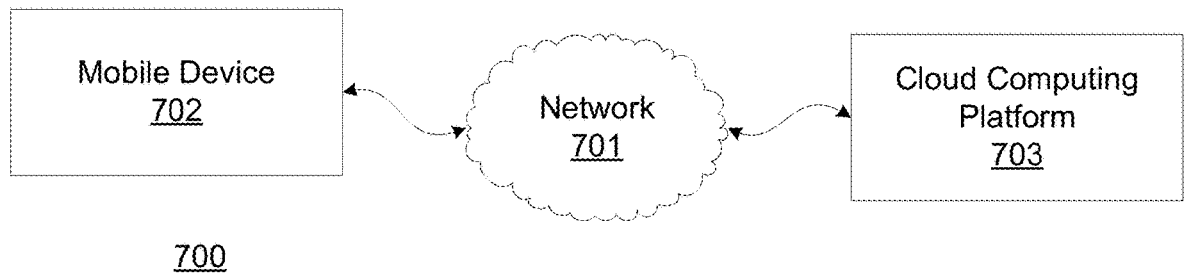
FIGS. 7A and 7B depict an illustrative computing environment for applying machine learning for enhanced application switching in accordance with one or more embodiments described herein.
Figure 7B:
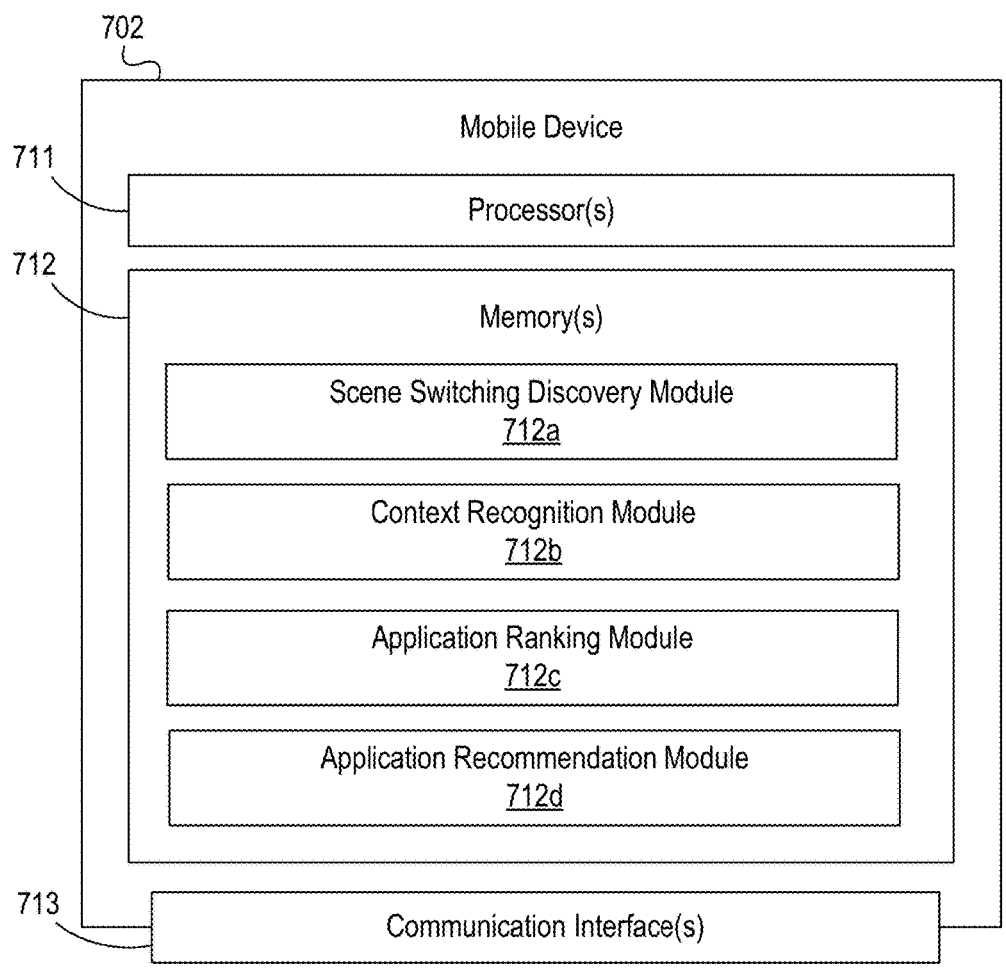

FIGS. 7A and 7B depict an illustrative computing environment configured to apply machine learning for enhanced application switching in accordance with one or more example embodiments. Referring to FIG. 7A, computing environment 700 may include one or more computer systems. For example, computing environment 700 may include a mobile device 702 and a cloud computing platform 703.

As illustrated in greater detail below, mobile device 702 may be a personal computing device such as a mobile phone, tablet, laptop computer, desktop computer, or the like. In some instances mobile device 702 may be configured to access one or more local and/or cloud based applications. In these instances, mobile device 702 may be configured to display and/or otherwise present one or more graphical user interfaces corresponding to these applications and/or navigational interfaces that may be used to access the applications.

Cloud computing platform 703 may be a computer system that includes one or more computing devices (servers, server blades, or the like) and/or other computer components (e.g., processors, memories, communication interfaces). In some instances, cloud computing platform 703 may be configured to communicate with mobile device 702. For example, cloud computing platform 703 may be configured to host an image classifier, and may be configured to update the image classifier using training samples provided by the mobile. In these instances, the cloud computing platform 703 may send and/or otherwise make the updated image classifier available for download to the mobile device 702.

Computing environment 700 may also include one or more networks, which may interconnect mobile device 702 and cloud computing platform 703. For example, computing environment 700 may include a wired or wireless network 701 (which may e.g., interconnect mobile device 702 and cloud computing platform 703).

In one or more arrangements, mobile device 702, cloud computing platform 703, and/or the other systems included in computing environment 700 may be any type of computing device capable of receiving a user interface (e.g., application interface, navigational interface, or the like), receiving input via the user interface, and communicating the received input to one or more other computing devices. For example, mobile device 702, cloud computing platform 703, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of mobile device 702 and cloud computing platform 703 may, in some instances, be special purpose computing devices configured to perform specific functions.

Referring to FIG. 7B, mobile device 702 may include one or more processors 711, memory 712, and communication interface 713. A data bus may interconnect processor 711, memory 712, and communication interface 713. Communication interface 713 may be a network interface configured to support communication between the mobile device 702 and one or more networks (e.g., network 701, or the like). Memory 712 may include one or more program modules having instructions that when executed by processor 711 cause mobile device 702 to perform one or more functions described herein and/or access one or more databases that may store and/or otherwise maintain information which may be used by such program modules and/or processor 711. In some instances, the one or more program modules and/or databases may be stored by and/or maintained in different memory units of mobile device 702 and/or by different computing devices that may form and/or otherwise make up mobile device 702. For example, memory 712 may have, host, store, and/or include scene switching discovery module 712*a*, context recognition module 712*b*, application ranking module 712*c*, and application recommendation module 712*d*. Scene switching discovery module may have instructions that direct and/or cause mobile device 702 to capture, insert, and/or aggregate data samples in a local repository, as discussed in greater detail below. The context recognition module 712*b* may have instructions that direct and/or cause mobile device 702 to tag application contextual information and forecast subsequently accessed applications accordingly, as discussed in greater detail below. The application ranking module 712*c* may have instructions that direct and/or cause mobile device 702 to record application information (e.g., application name, device name, switch in/switch out timestamps, or the like) as contextual information in the local repository when application switching occurs, and to rank applications accordingly, as discussed in greater detail below. Application recommendation module 712*d* may have instructions that direct and/or cause mobile device 702 to provide a next application recommendation based on the analysis performed by the scene switching discovery module 712*a*, context recognition module 712*b*, and/or application ranking module 712*c*, as discussed in greater detail below.

Figure 8A:
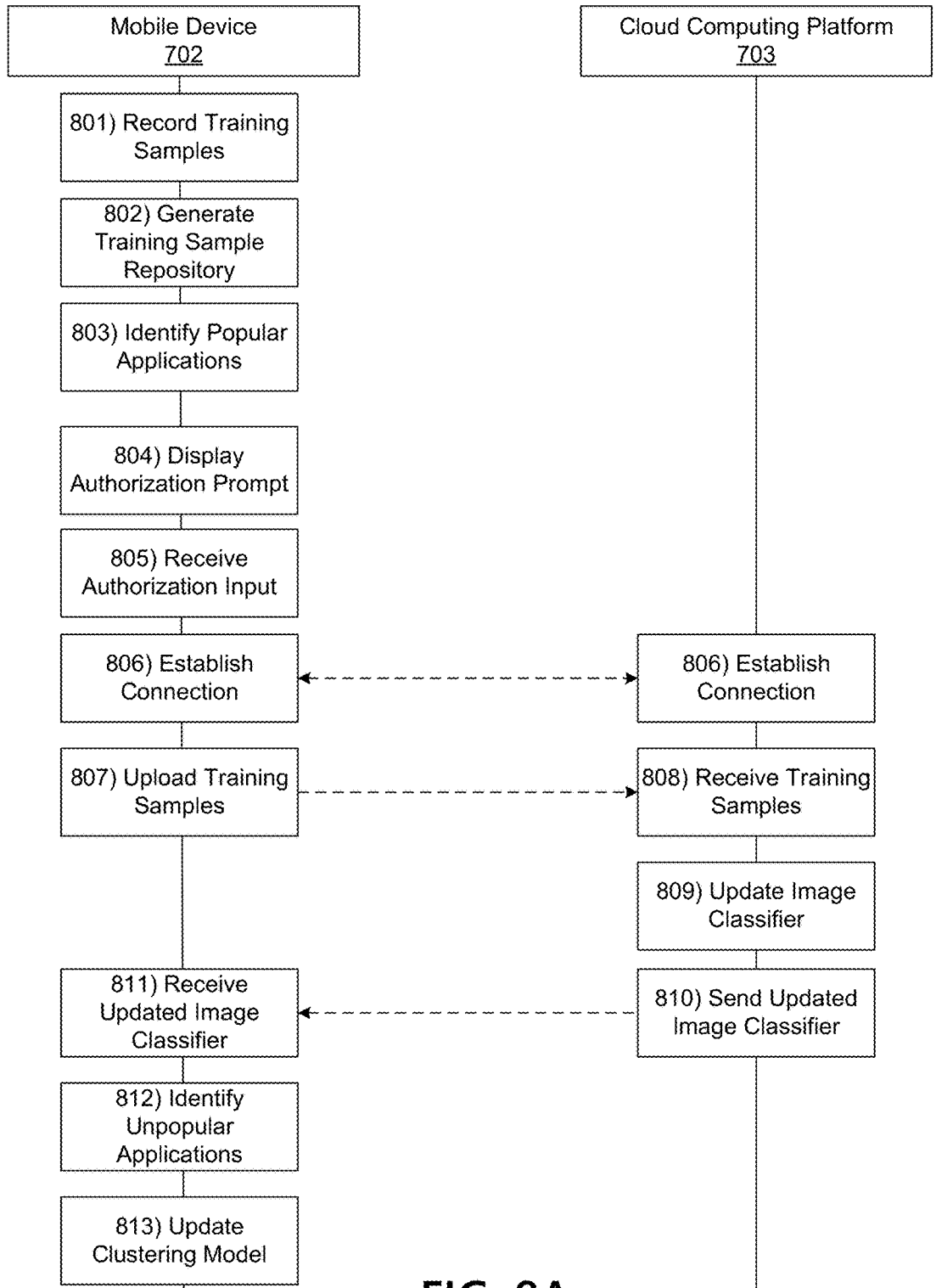
FIGS. 8A-8B depict an illustrative event sequence for applying machine learning for enhanced application switching in accordance with one or more embodiments described herein.
Figure 8B:
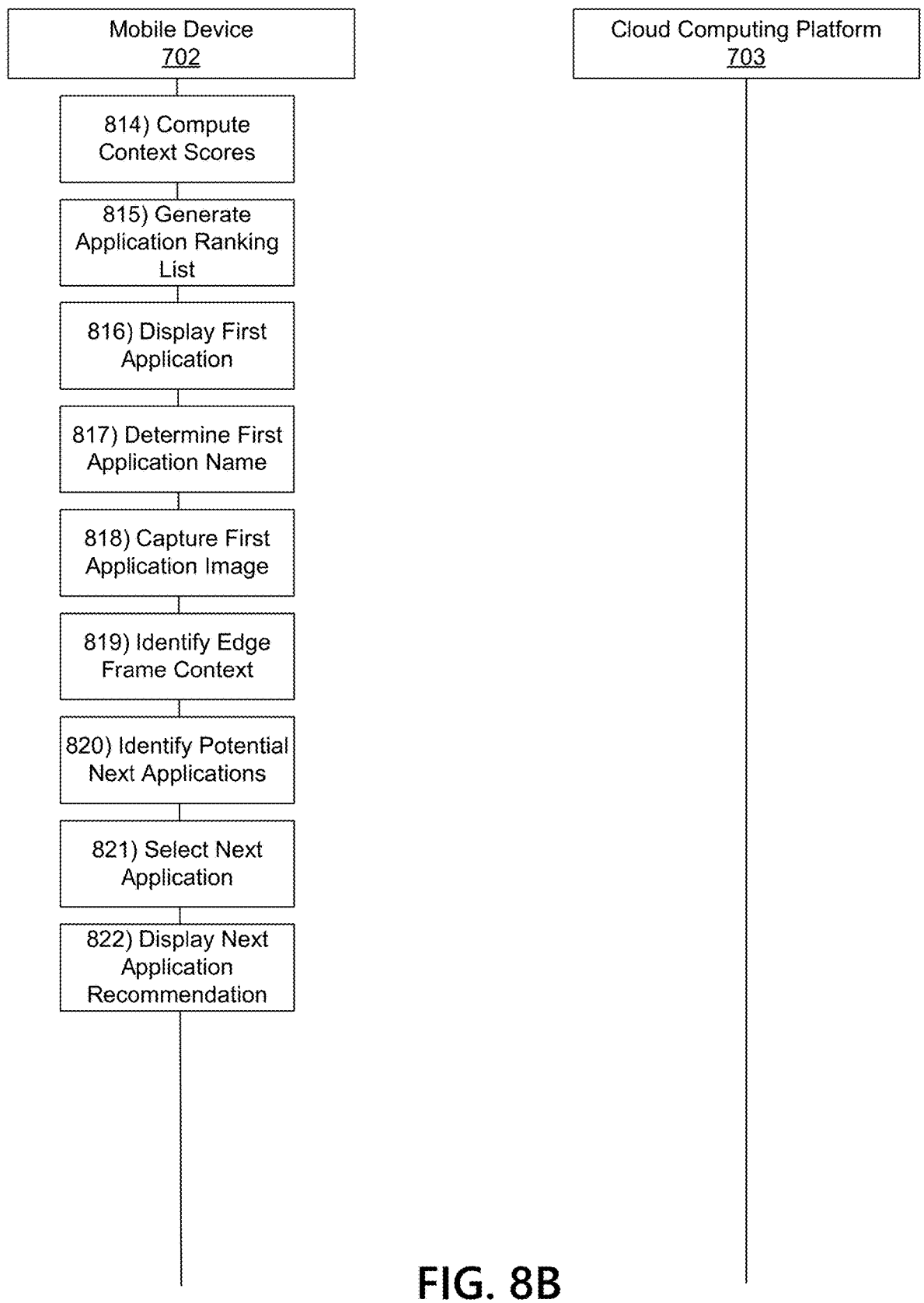

FIGS. 8A-8B depict an illustrative event sequence for applying machine learning for enhanced application switching in accordance with one or more example embodiments. For convenience, steps 801-822 are shown across FIGS. 8A-8B. However, it should be understood that steps 801-822 represent a single event sequence (e.g., step 814 in FIG. 8B may follow step 813 in FIG. 8A).

Briefly, the illustrative event sequence described herein describes scene switching discovery, context recognition by image classification, application frequency ranking, and next application recommendation. A scene switching discovery service records application contextual information in a local repository, including device name, application name, context tag of an edge frame, application switch-in/out timestamps, or the like. Except for raw data records, application dependency is detected and access frequency is aggregated by application name and context tag. Context recognition module classifies edge frames by either supervised learning models or unsupervised learning models, depending on how popular the applications are. Edge frames of popular applications may be classified by pre-trained models. Edge frames for other applications may be locally clustered through unsupervised learning (e.g., KNN, K-Means, or the like). With regard to application frequency rankings, a context level score may be computed by EWMA based on access frequency of subsequent applications at a context level over a predetermined period of time. Then applications with the highest context level scores may be recommended to the end user.

Referring to FIG. 8A, at step 801, the mobile device 702 may record a plurality of training samples. For example, to perform various activities, the mobile device 702 may switch from an initial application (e.g., presented at a first time) to a subsequent application (e.g., presented at a second time, after the first time). In these instances, the mobile device 702 may access the subsequent application after accessing the initial application, without accessing intervening applications between the initial application and the subsequent application. In accessing the subsequent application, the mobile device 702 may perform an interface transition (referred to herein as "scene switching"). In performing this scene switching, the mobile device 702 may display a final screen bitmap of the initial application (referred to herein as an "edge frame") prior to performing the scene switching.

While performing scene switching, the mobile device 702 may collect corresponding metadata. For example, the mobile device 702 may collect a switch-in time (a timestamp when the initial application becomes the foremost application), and/or a switch-out time (e.g., a timestamp when the initial application is exited, moved to the background, or the like). At the switch-out time, the mobile device 702 may capture an edge frame corresponding to the initial application.

The mobile device 702 may compute a popularity score for the initial application based on a number of times within a predetermined time period the initial application is accessed, and may compare the computed popularity score to a popularity threshold. If the mobile device 702 determines that the computed popularity score exceeds the popularity threshold, the mobile device 702 may apply supervised learning (e.g., using convolutional neural networks) to the edge frame to identify a context corresponding to the edge frame. For initial training samples, image clustering (as is described further below with regard to step 813) may be performed on edge frames manually captured (e.g., by employees of an enterprise organization maintaining the cloud computing platform 703, or the like).

If the mobile device 702 determines that the computed popularity score does not exceed the popularity threshold, the mobile device 702 may apply unsupervised learning (e.g., K-nearest neighbors (KNN) algorithms, K-means, or the like) to identify a context corresponding to the edge frame. For initial training samples, the mobile device 702 may apply classification models consisting of edge frames manually captured (e.g., by employees of an enterprise organization maintaining the cloud computing platform 703, or the like) and any reshaped duplicates. For example, contextual images may be manually captured when application switching occurs. These images may be resized into different copies with varied resolutions and/or length-width ratios. These resized images may be replicated into new copies with random noise data, and then duplicated with translation, scale, flip, rotation, and/or shear. It should be understood, however, that with time, user specific training samples may be collected based on the users interactions with the mobile device 702 (which is described, for example, at step 809). After identifying the context corresponding to the edge frame, the mobile device 702 may tag the edge frame with the corresponding context (e.g., embed a context tag, or the like).

In addition, the mobile device 702 may identify an application name (a unique application name) for the initial application and a device name (a unique device identifier) for the mobile device 702. In some instances, the mobile device 702 may identify an application switch interval (a time interval between switch-out time of the initial application and switch-in time of the subsequent application).

In some instances, if the mobile device 702 identifies that the application switch interval is less than a specific threshold, the mobile device 702 may identify a next application (e.g., next application name). For example, if there is a period of time between exiting the initial application and launching the subsequent application that does not exceed the specific threshold, the subsequent application may be logically related to the initial application (e.g., the user may be performing a task or activity in the subsequent application based on information from the initial application). If the mobile device 702 does not identify the name of the subsequent application (e.g., because of the duration of the application switch interval), the mobile device 702 may set the value of next application to null. In contrast, if there is a period of time between exiting the initial application and launching the subsequent application that exceeds the specific threshold, the subsequent application might not be logically related to the initial application (e.g., a user may simply be beginning a new task or activity at a later time).

Using the edge frame and this corresponding metadata (e.g., the application name, device name, switch-in time, switch-out time, context tag, application switch interval, and/or next application), the mobile device 702 may record a training sample. It should be understood that the mobile device 702 may repeat this process described at step 801 to generate a plurality of training samples.

At step 802, the mobile device 702 may store the plurality of training samples, generated at step 801, to generate a training sample repository. In some instances, in storing the plurality of training samples, the mobile device 702 may store a local training sample repository representative of application switching performed on the mobile device 702 within a predetermined time period (e.g., a day).

At step 803, the mobile device 702 may identify a first subset of the training samples from the training sample repository that correspond to popularity scores exceeding the predetermined popularity threshold. In doing so, the mobile device 702 may identify training samples corresponding to a list of popular applications.

Figure 9:
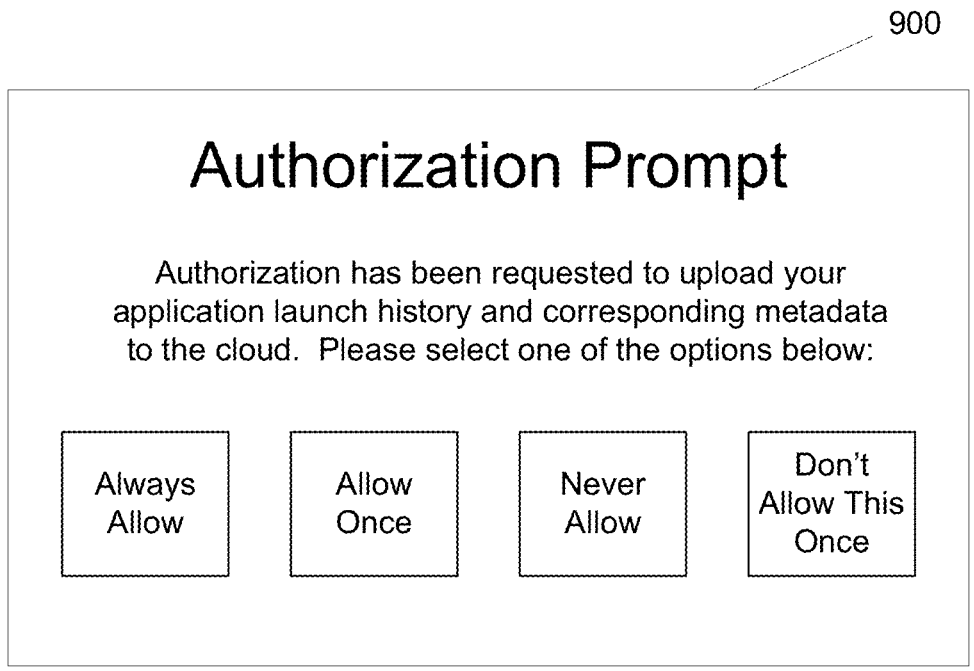
FIG. 9 depicts an illustrative user interface for applying machine learning for enhanced application switching in accordance with one or more embodiments described herein.

At step 804, the mobile device 702 may generate and display an authorization prompt requesting access to upload the first subset of the training samples to the cloud computing platform 703. For example, in displaying the authorization prompt, the mobile device 702 may display a graphical user interface similar to graphical user interface 900, which is shown in FIG. 9. For example, the mobile device 702 may display a prompt explaining that authorization has been requested, a prompting a user to provide a response such as "always allow," "allow once," "never allow," "don't allow this once," or the like.

At step 805, the mobile device 702 may receive an authorization input. For example, the mobile device 702 may receive a user input indicating whether or not authorization has been granted to upload the first subset of the training samples to the cloud computing platform 703. If the mobile device 702 receives a user input indicating that the first subset of the training samples may be uploaded, the mobile device 702 may proceed to step 806. If the mobile device 702 receives a user input indicating that the first subset of the training samples should not be uploaded, the mobile device may proceed to step 812.

At step 806, the mobile device 702 may establish a connection with the cloud computing platform 703. For example, the mobile device 702 may establish a wireless data connection with the cloud computing platform 703 to link the mobile device 702 to the cloud computing platform 703. In some instances, the mobile device 702 may identify whether a connection is already established with the cloud computing platform 703. If a connection is already established with the cloud computing platform 703, the mobile device 702 might not re-establish the connection. If a connection is not yet established with the cloud computing platform 703, the mobile device 702 may establish the wireless data connection as described herein.

At step 807, the mobile device 702 may upload the first subset of the training samples to the cloud computing platform 703. In some instances, the mobile device 702 may upload the first subset of the training samples to the cloud computing platform 703 via the communication interface 113 and while the wireless data connection is established.

At step 808, the cloud computing platform 703 may receive the first subset of the training samples from the mobile device 702. In some instances, the cloud computing platform 703 may receive the first subset of the training samples while the wireless data connection is established. It should be understood that although steps 804-808 are described with regard to the first subset of the training samples in its entirety, it should be understood that authorization and the corresponding steps may be performed on an application by application basis (e.g., a user may grant permission for a first application but not a second application, and vice versa).

At step 809, the cloud computing platform 703 may update a stored image classifier using the first subset of the training samples received at step 808. In some instances, the cloud computing platform 703 may have multiple image classifiers, each corresponding to one of a plurality of applications. In these instances, the cloud computing platform 703 may update the image classifiers on an application by application basis based on the first subset of the training samples received at step 808. In some instances, the cloud computing platform 703 may updated the image classifiers using the methods described above at step 201 with regard to initial training of the models. For example, contextual images may be manually captured when application switching occurs. These images may be resized into different copies with varied resolutions and/or length-width ratios. These resized images may be replicated into new copies with random noise data, and then duplicated with translation, scale, flip, rotation, and/or shear. In some instances, these images may be manually tagged with context tags (e.g., by employees of an enterprise organization maintaining the cloud computing platform 703, or the like), and may be used to update the image classifier. Additionally or alternatively, as images are increasingly automatically tagged with a context, these images may contain, in some instances, automatically identified context tags, and may be used to update the image classifier.

In some instances, the cloud computing platform 703 may identify image classifiers that have not been updated within a predetermined time period (e.g., a week, 20 days, a month, or the like), and may update those identified image classifiers. In other instances, the cloud computing platform 703 may update all image classifiers. By updating these image classifiers at the cloud computing platform 703, the cloud computing platform 703 may conserve computational resources at the mobile device 702.

At step 810, the cloud computing platform 703 may send, share, or otherwise provide updated image classifiers to the mobile device 702. In some instances, the cloud computing platform 703 may send the updated image classifiers to the mobile device 702 while the wireless data connection is established.

At step 811, the mobile device 702 may receive or otherwise access the updated image classifiers. In some instances, the mobile device 702 may receive the updated image classifiers from the cloud computing platform 703 while the wireless data connection is established, and may locally store the updated image classifiers.

At step 812, the mobile device 702 may identify a second subset of the training samples from the training sample repository that correspond to popularity scores exceeding the predetermined popularity threshold. In doing so, the mobile device 702 may identify training samples corresponding to a list of unpopular applications.

At step 813, the mobile device 702 may identify whether a stored clustering model has been updated within a predetermined period of time (e.g., a week, 20 days, a month, or the like). If the stored clustering model has been updated within the predetermined period of time, the mobile device 702 might not update the stored clustering model. If the stored clustering model has not been updated within the predetermined period of time, the mobile device 702 may update the stored clustering model based on the second subset of the training samples. For example, the mobile device 702 may cluster edge frames using unsupervised learning algorithms such as K-Means, KNN, or the like. Edge frames may be input to the clustering model and context of the edge frames may be the outputs. In some instances, these contextual outputs may be unique tags to differentiate contextual images, but that do not have a meaningful name (e.g., tag 1, tag 2, tag 3, or the like). In some instances, edge frames input to the stored clustering model may be pre-labeled (e.g., by a user, or the like), which may cause the unsupervised learning to evolve to semi-supervised learning.

In some instances, the mobile device 702 may maintain multiple clustering models, each corresponding to a particular application. In these instances, the mobile device 702 may update the clustering models on an application by application basis.

Referring to FIG. 8B, at step 814, the mobile device 702 may compute context level scores corresponding the training samples in the local repository. For example, the mobile device 702 may group the training samples based on application names and context tags, and may apply an exponentially weighted moving average (EWMA) algorithm to identify a frequency score for each subsequently accessed application related to each initial application-context tag pair.

For example, EWMA is a first-order infinite impulse response filter that applies weighting factors which decrease exponentially. Accordingly, the weight for older data decreases exponentially without reaching zero. In some instances, the mobile device 702 may apply such algorithms to forecast application access frequency at a context level based on user behaviors over a predetermined period of time (e.g., a week, two weeks, or the like). In some instances, the mobile device 702 may compute the EWMA for a series X in sequence recursively using the following equation: $Y_n = \theta Y_{n-1} + (1-\theta)X_n$. In these instances, the mobile device 702 may calculate $Y_n$ as the exponential weighted moving average at n, where n is a day index in sequence starting from one and, $X_n$ is an access frequency value of a subsequent application in a day at n. In doing so, the mobile device 702 may calculate $$\theta = \min\left\{a, \frac{1+C}{\beta+c}\right\},$$

where C is a total number of days elapsed, $\alpha$ is a degree of weighting decrease after a cold start phase, and $\theta$ is a maximum value between $\alpha$ and $$\frac{1+C}{\beta+C}.$$

Further, in doing so, the mobile device 702 may calculate $$\beta = \frac{1+T}{\alpha} - T,$$

where $\beta$ is a regulation factor for weighting decay in the cold start phase, and T is a number of days in the cold start phase.

The above formulas state that the value of the moving average (Y) at day n is a mix between a value of raw signal (X) at day n and the previous value of the moving average itself. In these instances, the degree of mixing may be controlled by the hyper parameter $\theta$ in the range of [0, 1]. The higher that $\theta$ is, the more likely it is that most contribution for that application-context pair comes from older data. In contrast, the lower that is, the more likely it is that most contribution for the application-context pair is recent data.

In some instances, the mobile device 702 may apply bias variance in computing the context level scores in a cold start phase due to the small amount of available data samples for performing the computation. As described herein, the mobile device 702 may apply a monotone increasing function to select different values of 9, which may start at roughly 0.5 for bias correction in the cold start phase. Once the cold start phase has been completed, the mobile device 702 may set $\theta$ to equal the constant coefficient $\alpha$. In some instances, the mobile device 702 may set the coefficient $\theta$ equal to 0.95 and may determine the frequency scores based on data from a historical twenty day period.

Accordingly, to summarize the events at step 214, the mobile device 702 may count frequency of subsequent applications by context level by day. The mobile device 702 may update $\theta$ on a daily basis to correct bias variance in a cold start phase. Then, after the cold start phase has been completed, the mobile device 702 may set $\theta$ equal to 0.95. The mobile device 702 may then apply EWMA algorithms by forecast a context level score for each initial application-context tag-subsequent application combination.

Figure 10:
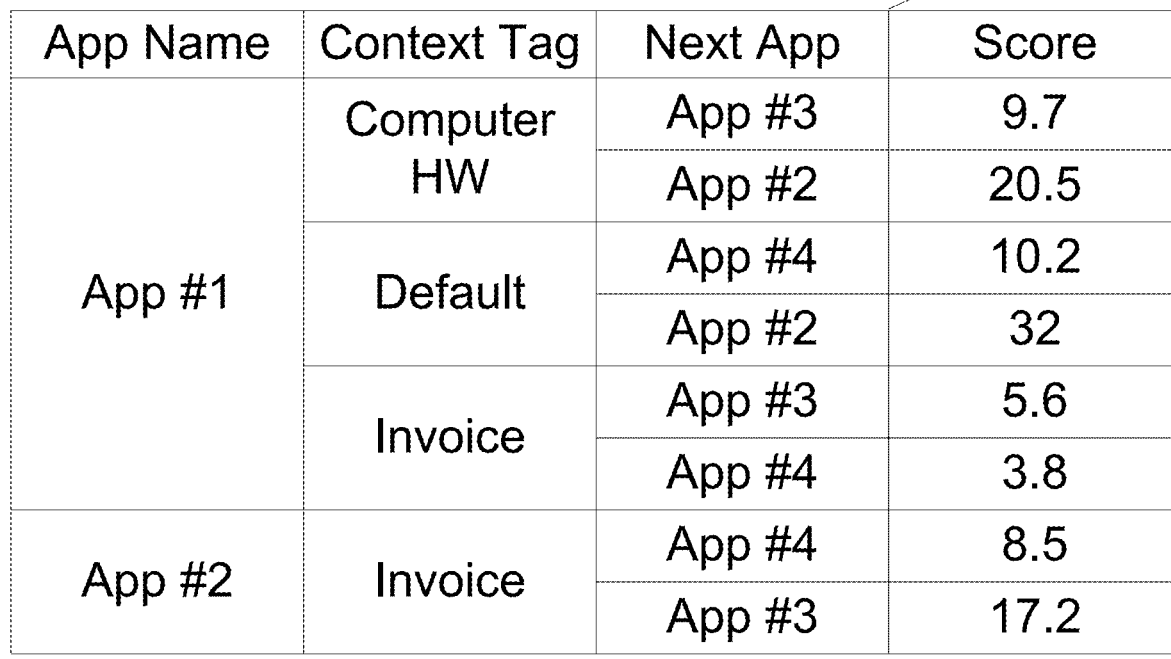
FIGS. 10 and 11 depict illustrative tables for applying machine learning for enhanced application switching in accordance with one or more embodiments described herein.

An example of these context level scores is shown, for example, in table 1000, which is shown in FIG. 10. For example, over the last 20 days, a user may have accessed a first application, and the mobile device 702 may have identified contexts of "computer homework," "default," and "invoice" corresponding to edge frames of the first application. When computer homework was identified as the context tag for the edge frame, the next application was identified as a second application or a third application in instances over the last 20 days. Then, for each initial application-context tag-subsequent application combination (e.g., first application—computer homework—third application, or the like), the mobile device 702 may compute a context level score indicating an EWMA score related to how often each subsequent application (e.g., the second application or the third application) was accessed. In doing so, the mobile device 702 may weight newer data more heavily than older data. As an example, the mobile device 702 may have actually identified that 60% of the time when an edge frame corresponding to the first application was identified as computer homework over the last 20 days, the third application was accessed. However, the mobile device 702 may identify that in the last three days, the second application has been accessed every time the computer homework context tag was identified with the first application. Accordingly, even though the third application has been accessed more frequently, the second application may have a higher context level score.

Figures 11, 12:
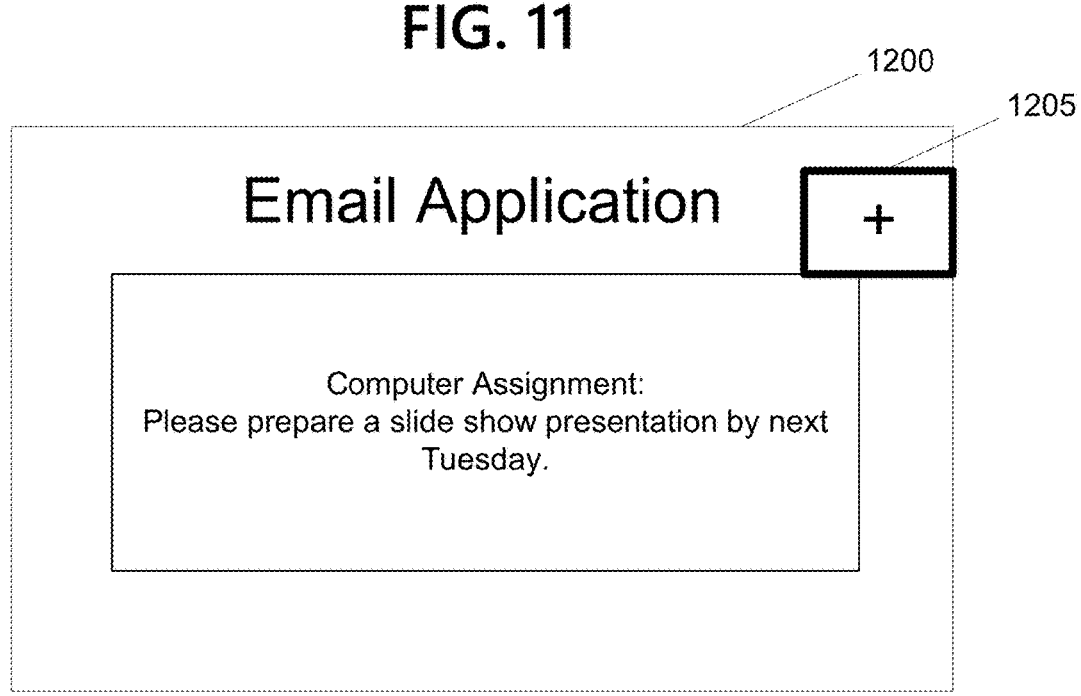
FIGS. 12 and 13 depict illustrative user interfaces for applying machine learning for enhanced application switching in accordance with one or more embodiments described herein.

At step 815, the mobile device 102 may generate an application ranking list. In doing so, the mobile device 102 may rank subsequent applications at the context level based on the context level scores computed at step 814. An example application ranking list is shown in table 1100, which is shown in FIG. 11. For example, within each initial application-context tag pair, the mobile device 702 may rank the next applications based on their context level scores (e.g., the second application has a higher score than the third application, so it should be ranked higher in the ranking list). In some instances, the mobile device 102 may update the application ranking list on a daily basis and/or at another predetermined time interval. Accordingly, by performing steps 801-815, the mobile device 702 and/or the cloud computing platform 703 may generate and train machine learning models that may be used to identify, based on an initial application and the context of that initial application, a most likely application that a user will subsequently request and/or access.

At step 816, the mobile device 702 may display a first application. For example, the mobile device 702 may display the first application in response to a user input requesting access to the first application via a display of the mobile device 702. For illustrative purposes, the first application described at step 816 may be the first application described with regard to the application ranking list in FIG. 11, which is described above, and it may be assumed that the first application is, for example, an electronic messaging application.

At step 817, the mobile device 702 may determine a name of the first application. For example, the mobile device 702 may access metadata and/or other properties of the first application to identify that the application is entitled "First Application."

At step 818, the mobile device 702 may capture an edge frame from the first application. For example, the mobile device 702 may capture a screenshot of the first application.

At step 819, the mobile device 702 may identify a popularity score of the first application (e.g., as described above with regard to steps 803 and 812). For example, the mobile device 702 may compute a popularity score for the first application based on a number of times the first application has been accessed over a predetermined period of time. This may, in some instances, be similar to the popularity score described above at step 801 with regard to the training samples. If the mobile device 702 identifies that the popularity score is below the predetermined popularity threshold, the mobile device 702 may apply unsupervised learning to identify a context of the screenshot. For example, the mobile device 702 may apply the updated clustering model from step 813 to the screenshot.

If the mobile device 702 identifies that the popularity score exceeds the predetermined popularity threshold, the mobile device 702 may apply supervised learning to identify a context of the screenshot. For example, the mobile device 702 may apply the updated image classifier received at step 811 to the screenshot. As an example, at step 819, the mobile device 702 may identify that a context for the first application is computer homework (e.g., the screenshot may contain a message discussing an assignment, or the like).

Compared to unsupervised learning, supervised learning may achieve better accuracy, but may require more data to train a model. Given the number of available applications, it may be impossible to construct pre-trained models for all available applications. As a result, different types of learning (e.g., supervised or unsupervised), may be used to tag contextual images for different applications. For example, pre-trained models empowered by supervised learning (e.g., CNN, or the like) may be applied to popular applications (e.g., because more data may be available for these applications to train the models) and unsupervised learning (e.g., K-means, KNN, or the like) may be used to cluster images for other applications (e.g., because less data may be available, which may be insufficient to train models for supervised learning).

In some instances, image classification by CNNs may be more sensitive to image features such as layout and edge than to low level details. For example, such image classification may tolerate a variety of variations associated with an image, including viewpoint variation, scale variation, image deformation, illumination conditions, background clutter, or the like. Furthermore, images that are missing certain information may still be robustly classified.

At step 820, as a result of the machine learning applied to the screenshot and the context identified at step 819, the mobile device 702 may identify potential next applications using the ranking list (e.g., as described at step 815 and in FIG. 11). For example, the mobile device 702 may identify that, over the past twenty days, the second application and the third application have been accessed after the first application when the computer homework context has been identified.

At step 821, the mobile device 702 may select a subsequent application from the ranking list based on the context level scores of the potential next applications identified at step 820. For example, the mobile device 702 may identify that the second application has a context level score of 20.5 and the third application has a context level score of 9.7. Accordingly, the mobile device 702 may select the second application. For illustrative purposes, the second application may be a slideshow application and the third application may be a word processing program.

Figure 13:
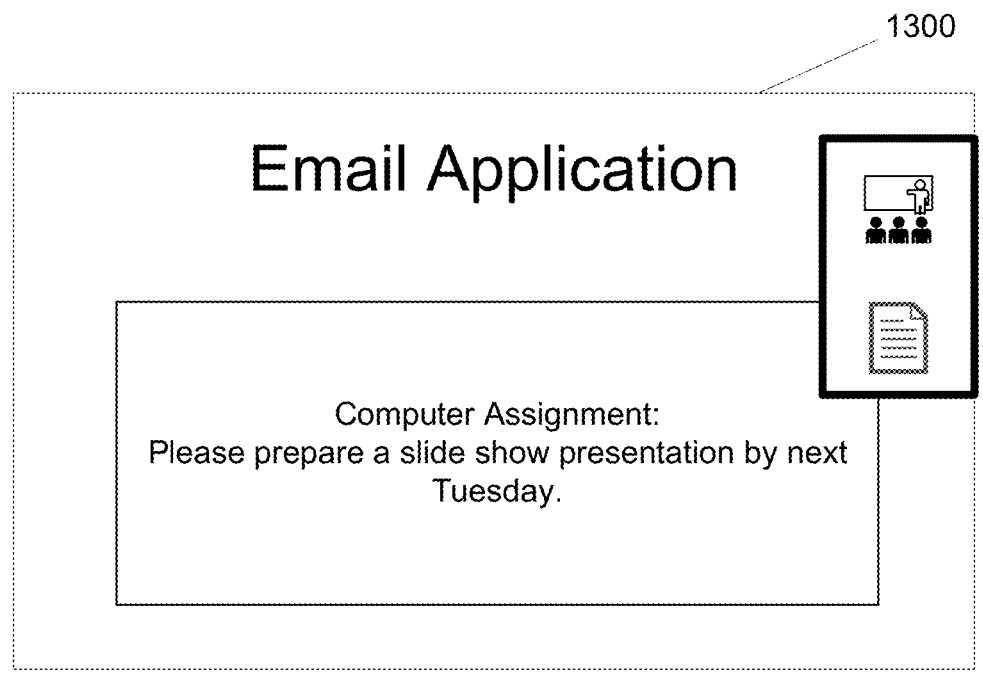

At step 822, the mobile device 702 may generate and display a next application recommendation. For example, the mobile device 702 may display a graphical user interface similar to graphical user interface 1200, which is shown in FIG. 12. For example, the mobile device 702 may display a selectable element 1205 within the first application. In some instances, in response to selection of the selectable element 1205, the mobile device 702 may display a graphical user interface similar to graphical user interface 1300, which is shown in FIG. 13. For example, the mobile device 702 may expand the selectable element 1205 to include icons corresponding to one or more applications. For example, the mobile device 702 may expand the selectable element 1205 to include an icon linked to the second application (e.g., a slideshow application) and an icon linked to the third application (e.g., a word processing application). In some instances, the mobile device 702 may only include a single application (e.g., as selected at step 821). In response to selection of, for example, the icon linked to the second application, the mobile device 702 may perform an application switch from the first application to the second application (e.g., from the email application to the slideshow application).

Figure 14:
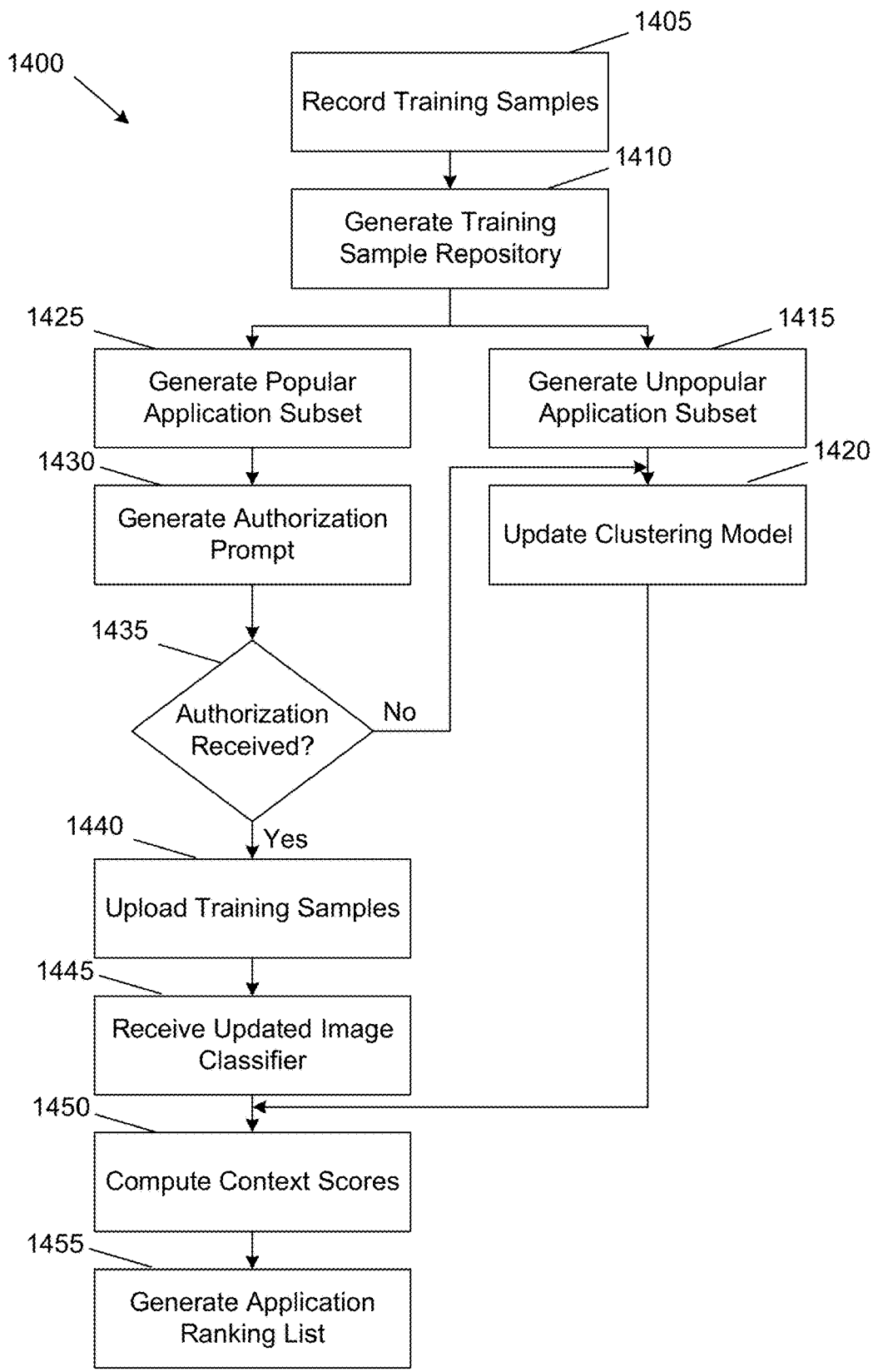
FIGS. 14 and 15 depict illustrative method algorithms for applying machine learning for enhanced application switching in accordance with one or more embodiments described herein.

FIG. 14 depicts an illustrative method algorithm 1400 for applying machine learning for enhanced application switching in accordance with one or more example embodiments. At step 1405, a computing device may record a plurality of training samples comprising application edge frames. At step 1410, the computing device may generate a training sample repository using the recorded training samples. At step 1415, the computing device may generate a subset of the recorded training samples corresponding to unpopular applications. At step 1420, the computing device may update a clustering model based on the subset of the recorded training samples. At step 1425, the computing device may generate a subset of the recorded training samples corresponding to popular applications. At step 1430, the computing device may generate and display an authorization prompt. At step 1435, the computing device may identify whether authorization was received. If authorization was not received, the computing device may return to step 1420. If authorization was received, the computing device may proceed to step 1440.

At step 1440, the computing device may upload the subset of the recorded training samples corresponding to popular applications to a cloud computing platform. At step 1445, the computing device may receive an updated image classifier from the cloud computing platform. At step 1450, the computing device may compute context level scores for each subsequently accessed application for each initial application-context tag pair resulting from steps 1415-1445. At step 1455, the computing device may generate an application ranking list based on the context level scores.

Figure 15:
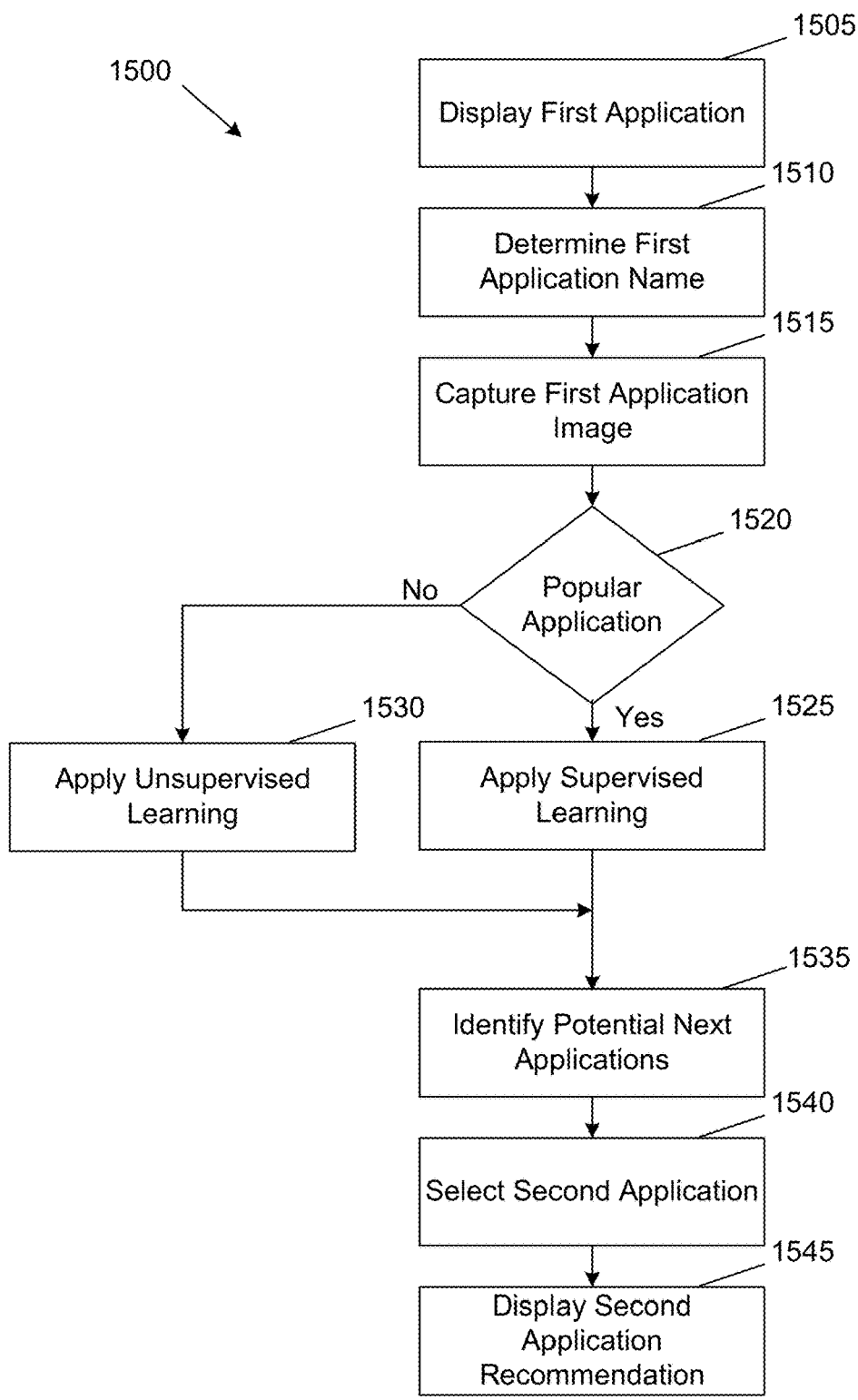

FIG. 15 depicts an illustrative method algorithm 1500 for applying machine learning for enhanced application switching in accordance with one or more example embodiments. At step 1505, a computing device may display a first application. At step 1510, the computing device may determine a name of the first application. At step 1515, the computing device may capture an image of the first application. At step 1520, the computing device may identify whether the application is a popular application. At step 1525, the computing device may apply supervised learning to the image of the first application to identify a context tag.

Returning to step 1520, if the application is not a popular application, the computing device may proceed to step 1530. At step 1530, the computing device may apply unsupervised learning to identify the context tag. At step 1535, based on the application name and the context tag, the computing device may identify potential next applications. At step 1540, the computing device may select a second application based on context level scores of the potential next applications. At step 1545, the computing device may display a second application recommendation. The following paragraphs (M1) through (M7) describe examples of methods that may be implemented in accordance with the present disclosure.

(M1) A method comprising capturing a first edge frame of a first application displayed on a display of the computing device; applying one or more machine learning models to the first edge frame of the first application to identify a context tag for the first application; identifying a plurality of applications subsequently accessed in a sequential manner after accessing the first application in a context corresponding to the identified context tag, wherein each of the plurality of applications corresponds to one of a plurality of context level scores; identifying a second application of the plurality of applications, wherein the second application corresponds to a higher context level score than remaining applications of the plurality of applications; and displaying, along with the first application, a selectable interface element corresponding to the second application of the plurality of applications, wherein selection of the selectable interface element causes the computing device to display a next application list that includes the second application.

(M2) A method may be performed as described in paragraph (M1) wherein the first edge frame comprises a screenshot from the first application, captured within a first predetermined period of time of an application switch from the first application to the second application.

(M3) A method may be performed as described in paragraph (M2) further comprising identify context information comprising, for the first edge frame, one or more of: a name of the first application, a unique device identification, a first timestamp of a launch time of the first application, a second timestamp of an exit time from the first application, a context tag, a time interval between the first timestamp and the second timestamp, or a name of the second application.

(M4) A method may be performed as described in any of paragraphs (M1) through (M3) further comprising generating, prior to capturing the first edge frame of the first application, a plurality of training samples, wherein generating each of the plurality of training samples comprises: 1) recording a timestamp corresponding to launch of an application; 2) recording a timestamp corresponding to exit from the application; 3) capturing, within a second predetermined period of time of the exit from the application, a corresponding edge frame of the application; 4) applying one or more machine learning algorithms to the corresponding edge frame to identify a corresponding context tag of the corresponding edge frame of the application; 5) identifying an application name and a device identifier corresponding to the launch of the application; 6) generating, based on the corresponding context tag, application name, and device identifier, a training sample; and 7) inserting, into a central repository, the training sample, resulting in storage of the plurality of training samples at the central repository.

(M5) A method may be performed as described in any of paragraphs (M1) through (M4) wherein applying the one or more machine learning algorithms comprises: 1) comparing a usage frequency value of the application to a predetermined application popularity threshold; 2) in response to determining that the usage frequency value of the application exceeds the predetermined application popularity threshold, applying one or more supervised learning techniques to the corresponding edge frame of the application; and 3) in response to determining that the usage frequency value of the application does not exceed the predetermined application popularity threshold, applying one or more unsupervised learning techniques to the corresponding edge frame of the application.

(M6) A method may be performed as described in any of paragraphs (M1) through (M5), further comprising identifying training samples for which the one or more supervised learning techniques were applied; displaying an authorization prompt requesting user input granting authorization for the identified training samples to be uploaded to a cloud computing device; uploading, in response to receiving the user input granting authorization, the identified training samples to the cloud computing device, wherein uploading the identified training samples causes the cloud computing device to update one or more stored image classifiers, each corresponding to a particular application; and downloading, once the one or more stored image classifiers have been updated based on the identified training samples, one or more updated image classifiers.

(M7) A method may be performed as described in any of paragraphs (M1) through (M6), further comprising identifying training samples for which the one or more unsupervised learning techniques were applied; determining, for each identified training sample, whether a corresponding image classifier has been updated within a third predetermined period of time; in response to determining that a particular image classifier has not been updated within the third predetermined period of time, updating a locally stored clustering model based on the identified training samples; and in response to determining that the particular image classifier has been updated within the third predetermined period of time, determining that the locally stored clustering model should not yet be updated.

The following paragraphs (A1) through (A12) describe examples of apparatuses that may be implemented in accordance with the present disclosure.

(A1) A computing device comprising at least one processor; a communication interface communicatively coupled to the at least one processor; and memory storying computer-readable instructions that, when executed by the at least one processor, cause the computing device to: capture a first edge frame of a first application displayed on a display of the computing device; apply one or more machine learning models to the first edge frame of the first application to identify a context tag for the first application; identify a plurality of applications subsequently accessed in a sequential manner after accessing the first application in a context corresponding to the identified context tag, wherein each of the plurality of applications corresponds to one of a plurality of context level scores; identify a second application of the plurality of applications, wherein the second application corresponds to a higher context level score than remaining applications of the plurality of applications; and display, along with the first application, a selectable interface element corresponding to the second application of the plurality of applications, wherein selection of the selectable interface element causes the computing device to display a next application list that includes the second application.

(A2) With regard to the computing device described in paragraph (A1) the first edge frame may comprise a screenshot from the first application, captured within a first predetermined period of time of an application switch from the first application to the second application.

(A3) With regard to the computing device described in paragraphs (A1) and (A2) the memory may store additional computer-readable instructions that, when executed by the at least one processor, further cause the computing device to: identify context information comprising, for the first edge frame, one or more of: a name of the first application, a unique device identification, a first timestamp of a launch time of the first application, a second timestamp of an exit time from the first application, a context tag, a time interval between the first timestamp and the second timestamp, or a name of the second application.

(A4) With regard to the computing device described in paragraphs (A1) through (A3), the memory may store additional computer-readable instructions that, when executed by the at least one processor, further cause the computing device to generate, prior to capturing the first edge frame of the first application, a plurality of training samples, wherein generating each of the plurality of training samples comprises: 1) recording a timestamp corresponding to launch of an application; 2) recording a timestamp corresponding to exit from the application; 3) capturing, within a second predetermined period of time of the exit from the application, a corresponding edge frame of the application; 4) applying one or more machine learning algorithms to the corresponding edge frame to identify a corresponding context tag of the corresponding edge frame of the application; 5) identifying an application name and a device identifier corresponding to the launch of the application; 6) generating, based on the corresponding context tag, application name, and device identifier, a training sample; and 7) inserting, into a central repository, the training sample, resulting in storage of the plurality of training samples at the central repository.

(A5) With regard to the computing device described in paragraphs (A1) through (A4), applying the one or more machine learning algorithms may comprise: 1) comparing a usage frequency value of the application to a predetermined application popularity threshold; 2) in response to determining that the usage frequency value of the application exceeds the predetermined application popularity threshold, applying one or more supervised learning techniques to the corresponding edge frame of the application, and 3) in response to determining that the usage frequency value of the application does not exceed the predetermined application popularity threshold, applying one or more unsupervised learning techniques to the corresponding edge frame of the application.

(A6) With regard to the computing device described in paragraphs (A1) through (A5), the memory may store additional computer-readable instructions that, when executed by the at least one processor, further cause the computing device to: 1) identify training samples for which the one or more supervised learning techniques were applied; 2) display an authorization prompt requesting user input granting authorization for the identified training samples to be uploaded to a cloud computing device; 3) upload, in response to receiving the user input granting authorization, the identified training samples to the cloud computing device, wherein uploading the identified training samples causes the cloud computing device to update one or more stored image classifiers, each corresponding to a particular application; and 4) download, once the one or more stored image classifiers have been updated based on the identified training samples, one or more updated image classifiers (A7) With regard to the computing device described in paragraphs (A1) through (A6), the memory may store additional computer-readable instructions that, when executed by the at least one processor, further cause the computing device to: 1) identify training samples for which the one or more unsupervised learning techniques were applied; 2) determine, for each identified training sample, whether a corresponding image classifier has been updated within a third predetermined period of time; 3) in response to determining that a particular image classifier has not been updated within the third predetermined period of time, update a locally stored clustering model based on the identified training samples; and 4) in response to determining that the particular image classifier has been updated within the third predetermined period of time, determine that the locally stored clustering model should not yet be updated.

(A8) With regard to the computing device described in paragraphs (A1) through (A7), applying the one or more machine learning algorithms to the first edge frame may comprise: 1) comparing a usage frequency value of the first application to the predetermined application popularity threshold; 2) in response to determining that the usage frequency value of the first application exceeds the predetermined application popularity threshold, applying one of the one or more updated image classifiers corresponding to the first application; and 3) in response to determining that the usage frequency value of the first application does not exceed the predetermined application popularity threshold, applying the locally stored clustering model to the first application.

(A9) With regard to the computing device described in paragraphs (A1) through (A8), prior to capturing the first edge frame for the first application, the computing platform may compute the plurality of context level scores, wherein computing the plurality of context level scores comprises: 1) identifying, within the plurality of training samples, a subset of the plurality of training samples collected within a fourth predetermined period of time; 2) computing, for each of the subset of the plurality of training samples, a switch interval, corresponding to an amount of time between an application launch and an application exit; 3) comparing each switch interval to a fourth predetermined period of time; and 4) for each of the subset of the plurality of training samples: a) in response to determining that the switch interval exceeded the fourth predetermined period of time, setting a next application value to a null value, and b) in response to determining that the switch interval did not exceed the fourth predetermined period of time, setting a next application value to a name of another application that was subsequently and sequentially accessed.

(A10) With regard to the computing device described in paragraphs (A1) through (A9) the memory may store additional computer-readable instructions that, when executed by the at least one processor, further cause the computing device to aggregate the plurality of training samples corresponding to each application represented in the plurality of training samples, resulting in an aggregated dataset that includes: 1) for each application name, an aggregation of one or more context tags from the plurality of training samples that corresponding to the application name, resulting in one or more application-context tag pairs, 2) for each application-context tag pair, one or more corresponding subsequently and sequentially accessed applications, resulting in one or more application-context tag-subsequent application correlations, and 3) for each application-context tag-subsequent application correlation, a frequency value, representing a number of times the application-context tag-subsequent application correlation is present in the plurality of training samples; and 4) compute, for each frequency value, a context level score.

(A11) With regard to the computing device described in paragraphs (A1) through (A10), computing the context level score may comprise computing an exponential weighted moving average by applying: $Y_n = \theta Y_{n-1} + (1-\theta)X_n$, where: 1) $Y_n$ is the exponential weighted moving average at n, where: n is a day index in sequence starting from one, 2) $X_n$ is an access frequency value of a subsequent application in a day at n, 3)

$$\theta = \min\left\{a, \frac{1+C}{\beta+c}\right\},$$

where: a) C is a total number of days elapsed, b) $\alpha$ is a degree of weighting decrease after a cold start phase, c) and $\theta$ is a maximum value between $\alpha$ and $$\frac{1+C}{\beta+C},$$

and 4)

$$\beta = \frac{1+T}{\alpha} - T,$$

where: $\beta$ is a regulation factor for weighting decay in the cold start phase, and T is a number of days in the cold start phase.

(A12) With regard to the computing device described in paragraphs (A1) through (A11), selection of the selectable interface element further may cause the computing device to launch the second application.

The following paragraph (CRM1) describes examples of computer-readable media that may be implemented in accordance with the present disclosure.

(CRM1) A non-transitory computer-readable medium storing instructions that, when executed, cause a system to capture first edge frame of a first application, wherein the first application is being displayed at the computing device; apply one or more machine learning models to the first edge frame of the first application to identify a context tag for the first application; identify a plurality of applications subsequently accessed in a sequential manner after accessing the first application in a context corresponding to the identified context, wherein each of the plurality of applications corresponds to one of a plurality of context level scores; identify a second application of the plurality of applications, wherein the second application corresponds to a higher context level score than remaining applications of the plurality of applications; and display, along with the first application, a selectable interface element corresponding to the second application of the plurality of applications, wherein selection of the selectable interface element causes the computing device to display a next application list that includes the second application.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device, comprising:
   at least one processor;
   a communication interface communicatively coupled to the at least one processor; and
   memory storying computer-readable instructions that, when executed by the at least one processor, cause the computing device to:
   capture a first edge frame of a first application displayed on a display of the computing device;
   apply one or more machine learning models to the first edge frame of the first application to identify a context tag for the first application;
   identify a plurality of applications subsequently accessed in a sequential manner after accessing the first application in a context corresponding to the identified context tag, wherein each of the plurality of applications corresponds to one of a plurality of context level scores;
   identify a second application of the plurality of applications, wherein the second application corresponds to a higher context level score than remaining applications of the plurality of applications;
   display, along with the first application, a selectable interface element corresponding to the second application of the plurality of applications, wherein selection of the selectable interface element causes the computing device to display a next application list that includes the second application;

generate, prior to capturing the first edge frame of the first application, a plurality of training samples, wherein generating each of the plurality of training samples comprises:
    recording a timestamp corresponding to launch of an application;
    recording a timestamp corresponding to exit from the application;
    capturing, within a second predetermined period of time of the exit from the application, a corresponding edge frame of the application; and
    applying one or more machine learning algorithms to the corresponding edge frame to identify a corresponding context tag of the corresponding edge frame of the application, wherein applying the one or more machine learning algorithms comprises:
        comparing a usage frequency value of the application to a predetermined application popularity threshold; and
        in response to determining that the usage frequency value of the application exceeds the predetermined application popularity threshold:
            applying one or more supervised learning techniques to the corresponding edge frame of the application;
    identify training samples for which the one or more supervised learning techniques were applied;
    display an authorization prompt requesting user input granting authorization for the identified training samples to be uploaded to a cloud computing device;
    upload, in response to receiving the user input granting authorization, the identified training samples to the cloud computing device, wherein uploading the identified training samples causes the cloud computing device to update one or more stored image classifiers, each corresponding to a particular application; and
    download, once the one or more stored image classifiers have been updated based on the identified training samples, one or more updated image classifiers.

2. The computing device of claim 1, wherein the first edge frame comprises a screenshot from the first application, captured within a first predetermined period of time of an application switch from the first application to the second application.

3. The computing device of claim 2, wherein the memory stores additional computer-readable instructions that, when executed by the at least one processor, further cause the computing device to:
    identify context information comprising, for the first edge frame, one or more of: a name of the first application, a unique device identification, a first timestamp of a launch time of the first application, a second timestamp of an exit time from the first application, a context tag, a time interval between the first timestamp and the second timestamp, or a name of the second application.

4. The computing device of claim 1, wherein generating each of the plurality of training samples further comprises:
    identifying an application name and a device identifier corresponding to the launch of the application;
    generating, based on the corresponding context tag, application name, and device identifier, a training sample; and
    inserting, into a central repository, the training sample, resulting in storage of the plurality of training samples at the central repository.

5. The computing device of claim 4, wherein applying the one or more machine learning algorithms further comprises:
    in response to determining that the usage frequency value of the application does not exceed the predetermined application popularity threshold:
        applying one or more unsupervised learning techniques to the corresponding edge frame of the application.

6. The computing device of claim 5, wherein the memory stores additional computer-readable instructions that, when executed by the at least one processor, further cause the computing device to:
    identify training samples for which the one or more unsupervised learning techniques were applied;
    determine, for each identified training sample, whether a corresponding image classifier has been updated within a third predetermined period of time;
    in response to determining that a particular image classifier has not been updated within the third predetermined period of time, update a locally stored clustering model based on the identified training samples; and
    in response to determining that the particular image classifier has been updated within the third predetermined period of time, determine that the locally stored clustering model should not yet be updated.

7. The computing device of claim 6, wherein applying the one or more machine learning algorithms to the first edge frame comprises:
    comparing a usage frequency value of the first application to the predetermined application popularity threshold;
    in response to determining that the usage frequency value of the first application exceeds the predetermined application popularity threshold:
        applying one of the one or more updated image classifiers corresponding to the first application; and
    in response to determining that the usage frequency value of the first application does not exceed the predetermined application popularity threshold:
        applying the locally stored clustering model to the first application.

8. The computing device of claim 4, wherein the memory stores additional computer-readable instructions that, when executed by the at least one processor, further cause the computing device to:
    prior to capturing the first edge frame for the first application, compute the plurality of context level scores, wherein computing the plurality of context level scores comprises:
        identifying, within the plurality of training samples, a subset of the plurality of training samples collected within a fourth predetermined period of time;
        computing, for each of the subset of the plurality of training samples, a switch interval, corresponding to an amount of time between an application launch and an application exit;
        comparing each switch interval to a fourth predetermined period of time; and
        for each of the subset of the plurality of training samples:
            in response to determining that the switch interval exceeded the fourth predetermined period of time, setting a next application value to a null value, and
            in response to determining that the switch interval did not exceed the fourth predetermined period of time, setting a next application value to a name of another application that was subsequently and sequentially accessed.

9. The computing device of claim 8, wherein the memory stores additional computer-readable instructions that, when executed by the at least one processor, further cause the computing device to:
  aggregate the plurality of training samples corresponding to each application represented in the plurality of training samples, resulting in an aggregated dataset that includes:
    for each application name, an aggregation of one or more context tags from the plurality of training samples corresponding to the application name, resulting in one or more application-context tag pairs,
    for each application-context tag pair, one or more corresponding subsequently and sequentially accessed applications, resulting in one or more application-context tag-subsequent application correlations, and
    for each application-context tag-subsequent application correlation, a frequency value, representing a number of times the application-context tag-subsequent application correlation is present in the plurality of training samples; and
  compute, for each frequency value, a context level score.

10. The computing device of claim 9, wherein computing the context level score comprises computing an exponential weighted moving average by applying:
$Y_n = \theta Y_{n-1} + (1-\theta)X_n$, wherein:
  $Y_n$ is the exponential weighted moving average at n, wherein:
    n is a day index in sequence starting from one;
  $X_n$ is an access frequency value of a subsequent application in a day at n;

$$\theta = \min\left\{\alpha, \frac{1+C}{\beta+c}\right\},$$

wherein:
  C is a total number of days elapsed,
  α is a degree of weighting decrease after a cold start phase, and
  θ is a maximum value between α and $$\frac{1+C}{\beta+C};$$

and $$\beta = \frac{1+T}{\alpha} - T,$$

wherein:
  β is a regulation factor for weighting decay in the cold start phase, and
  T is a number of days in the cold start phase.

11. The computing device of claim 1, wherein selection of the selectable interface element further causes the computing device to launch the second application.

12. A method comprising:
  at a computing device comprising at least one processor, a communication interface, and a memory:
    capturing first edge frame of a first application, wherein the first application is being displayed at the computing device;
    applying one or more machine learning models to the first edge frame of the first application to identify a context tag for the first application;
    identifying a plurality of applications subsequently accessed in a sequential manner after accessing the first application in a context corresponding to the identified context tag, wherein each of the plurality of applications corresponds to one of a plurality of context level scores;
    identifying a second application of the plurality of applications, wherein the second application corresponds to a higher context level score than remaining applications of the plurality of applications;
    displaying, along with the first application, a selectable interface element corresponding to the second application of the plurality of applications, wherein selection of the selectable interface element causes the computing device to display a next application list that includes the second application;
    generating, prior to capturing the first edge frame of the first application, a plurality of training samples, wherein generating each of the plurality of training samples comprises:
      recording a timestamp corresponding to launch of an application;
      recording a timestamp corresponding to exit from the application;
      capturing, within a second predetermined period of time of the exit from the application, a corresponding edge frame of the application; and
      applying one or more machine learning algorithms to the corresponding edge frame to identify a corresponding context tag of the corresponding edge frame of the application, wherein applying the one or more machine learning algorithms comprises:
        comparing a usage frequency value of the application to a predetermined application popularity threshold; and
        in response to determining that the usage frequency value of the application exceeds the predetermined application popularity threshold: applying one or more supervised learning techniques to the corresponding edge frame of the application;
    identifying training samples for which the one or more supervised learning techniques were applied;
    displaying an authorization prompt requesting user input granting authorization for the identified training samples to be uploaded to a cloud computing device;
    uploading, in response to receiving the user input granting authorization, the identified training samples to the cloud computing device, wherein uploading the identified training samples causes the cloud computing device to update one or more stored image classifiers, each corresponding to a particular application; and
    downloading, once the one or more stored image classifiers have been updated based on the identified training samples, one or more updated image classifiers.

13. The method of claim 12, wherein the first edge frame comprises a screenshot from the first application, captured within a first predetermined period of time of an application switch from the first application to the second application.

14. The method of claim 13, further comprising:
identifying context information comprising, for the first edge frame, one or more of: a name of the first application, a unique device identification, a first timestamp of a launch time of the first application, a second timestamp of an exit time from the first application, a context tag, a time interval between the first timestamp and the second timestamp, or a name of the second application.

15. The method of claim 12, wherein generating each of the plurality of training samples further comprises:
identifying an application name and a device identifier corresponding to the launch of the application;
generating, based on the corresponding context tag, application name, and device identifier, a training sample; and
inserting, into a central repository, the training sample, resulting in storage of the plurality of training samples at the central repository.

16. The method of claim 15, wherein applying the one or more machine learning algorithms further comprises:
in response to determining that the usage frequency value of the application does not exceed the predetermined application popularity threshold:
applying one or more unsupervised learning techniques to the corresponding edge frame of the application.

17. The method of claim 16, further comprising:
identifying training samples for which the one or more unsupervised learning techniques were applied;
determining, for each identified training sample, whether a corresponding image classifier has been updated within a third predetermined period of time;
in response to determining that a particular image classifier has not been updated within the third predetermined period of time, updating a locally stored clustering model based on the identified training samples; and
in response to determining that the particular image classifier has been updated within the third predetermined period of time, determining that the locally stored clustering model should not yet be updated.

18. One or more non-transitory computer-readable media storing instructions that, when executed by a computing platform comprising at least one processor, a communication interface, and memory, cause the computing platform to:
capture first edge frame of a first application, wherein the first application is being displayed at the computing device;
apply one or more machine learning models to the first edge frame of the first application to identify a context tag for the first application;
identify a plurality of applications subsequently accessed in a sequential manner after accessing the first application in a context corresponding to the identified context, wherein each of the plurality of applications corresponds to one of a plurality of context level scores;
identify a second application of the plurality of applications, wherein the second application corresponds to a higher context level score than remaining applications of the plurality of applications;
display, along with the first application, a selectable interface element corresponding to the second application of the plurality of applications, wherein selection of the selectable interface element causes the computing device to display a next application list that includes the second application;
generate, prior to capturing the first edge frame of the first application, a plurality of training samples, wherein generating each of the plurality of training samples comprises:
recording a timestamp corresponding to launch of an application;
recording a timestamp corresponding to exit from the application;
capturing, within a second predetermined period of time of the exit from the application, a corresponding edge frame of the application; and
applying one or more machine learning algorithms to the corresponding edge frame to identify a corresponding context tag of the corresponding edge frame of the application, wherein applying the one or more machine learning algorithms comprises:
comparing a usage frequency value of the application to a predetermined application popularity threshold; and
in response to determining that the usage frequency value of the application exceeds the predetermined application popularity threshold:
applying one or more supervised learning techniques to the corresponding edge frame of the application;
identify training samples for which the one or more supervised learning techniques were applied;
display an authorization prompt requesting user input granting authorization for the identified training samples to be uploaded to a cloud computing device;
upload, in response to receiving the user input granting authorization, the identified training samples to the cloud computing device, wherein uploading the identified training samples causes the cloud computing device to update one or more stored image classifiers, each corresponding to a particular application; and
download, once the one or more stored image classifiers have been updated based on the identified training samples, one or more updated image classifiers.

* * * * *